(12) United States Patent
Huang et al.

(10) Patent No.: US 7,773,630 B2
(45) Date of Patent: Aug. 10, 2010

(54) HIGH PERFORMANCE MEMORY BASED COMMUNICATIONS INTERFACE

(75) Inventors: Kaiyuan Huang, Ottawa (CA); Michael F. Kemp, Ottawa (CA)

(73) Assignee: Liquid Computing Corporation, Ottawa, Ontario (CA)

( * ) Notice: Subject to any disclaimer, the term of this patent is extended or adjusted under 35 U.S.C. 154(b) by 810 days.

(21) Appl. No.: 11/535,258

(22) Filed: Sep. 26, 2006

(65) Prior Publication Data

US 2007/0223483 A1 Sep. 27, 2007

Related U.S. Application Data

(60) Provisional application No. 60/736,004, filed on Nov. 12, 2005.

(51) Int. Cl.
*H04J 3/24* (2006.01)
(52) U.S. Cl. ...................................... 370/474
(58) Field of Classification Search ............. None
See application file for complete search history.

(56) References Cited

U.S. PATENT DOCUMENTS

| | | | |
|---|---|---|---|
| 4,841,526 A | 6/1989 | Wilson et al. | |
| 5,453,982 A | 9/1995 | Pennington et al. | |
| 5,469,571 A | 11/1995 | Bunnell | |
| 5,644,569 A | 7/1997 | Walker | |
| 5,721,820 A | 2/1998 | Abali et al. | |
| 5,832,240 A | 11/1998 | Larsen et al. | |
| 5,852,602 A | 12/1998 | Sugawara | |
| 5,918,055 A | 6/1999 | Crawford et al. | |
| 5,987,495 A | 11/1999 | Ault et al. | |
| 6,151,639 A | 11/2000 | Tucker et al. | |
| 6,161,152 A | 12/2000 | Garg et al. | |
| 6,181,704 B1 | 1/2001 | Drottar et al. | |
| 6,425,038 B1 | 7/2002 | Sprecher | |
| 6,453,360 B1 | 9/2002 | Muller et al. | |
| 6,459,698 B1 * | 10/2002 | Acharya | 370/392 |
| 6,539,436 B2 | 3/2003 | Garrigues et al. | |
| 6,628,965 B1 | 9/2003 | Larosa et al. | |
| 6,779,050 B2 | 8/2004 | Horton et al. | |
| 6,781,992 B1 | 8/2004 | Rana et al. | |
| 6,792,492 B1 | 9/2004 | Griffin | |
| 6,832,261 B1 | 12/2004 | Westbrook et al. | |
| 6,853,641 B2 | 2/2005 | Lindhorst-Ko et al. | |
| 6,895,010 B1 | 5/2005 | Chang et al. | |
| 6,914,877 B1 | 7/2005 | Alamineh | |

(Continued)

OTHER PUBLICATIONS

International Search Report mailed Feb. 10, 2008, in corresponding International Application No. PCT/IB2006/004296, filed Oct. 17, 2006.

(Continued)

*Primary Examiner*—Kwang B Yao
*Assistant Examiner*—Jeffrey M Rutkowski
(74) *Attorney, Agent, or Firm*—DLA Piper LLP US

(57) ABSTRACT

Embodiments of the present invention include enhanced functionalities and components within a Communication Endpoint Processor (CEP) that act as an interface between computational and communications domains. The embodiments disclosed herein deliver a complete memory mapped high performance interface that has the ability to support the simultaneous transmission of multiple frames of multiple sizes, and that has the ability to interrupt the transmission of lower priority frames in order to send higher priority frames.

32 Claims, 16 Drawing Sheets

U.S. PATENT DOCUMENTS

| | | | |
|---|---|---|---|
| 6,978,312 | B2 | 12/2005 | Eydelman et al. |
| 7,133,407 | B2 | 11/2006 | Jinzaki et al. |
| 7,139,268 | B1 | 11/2006 | Bhagwat et al. |
| 7,266,688 | B2 | 9/2007 | Fronberg |
| 7,409,468 | B2* | 8/2008 | Biran et al. .................... 710/6 |
| 7,478,138 | B2 | 1/2009 | Chang et al. |
| 7,512,128 | B2* | 3/2009 | DiMambro et al. ......... 370/393 |
| 7,561,567 | B1 | 7/2009 | Olson et al. |
| 7,580,519 | B1* | 8/2009 | Goh ........................... 380/29 |
| 2002/0004842 | A1 | 1/2002 | Ghose et al. |
| 2002/0009075 | A1* | 1/2002 | Fesas, Jr. .................... 370/363 |
| 2002/0032821 | A1 | 3/2002 | Garrigues et al. |
| 2002/0138790 | A1 | 9/2002 | Nishtala |
| 2003/0035420 | A1 | 2/2003 | Niu |
| 2004/0030745 | A1* | 2/2004 | Boucher et al. ............. 709/203 |
| 2004/0062201 | A1 | 4/2004 | Deshpande |
| 2004/0088641 | A1 | 5/2004 | Torsner et al. |
| 2004/0133802 | A1* | 7/2004 | Liu ............................ 713/200 |
| 2004/0165588 | A1* | 8/2004 | Pandya ....................... 370/389 |
| 2005/0053084 | A1 | 3/2005 | Abrol et al. |
| 2005/0091383 | A1* | 4/2005 | Bender et al. ............... 709/228 |
| 2005/0091502 | A1 | 4/2005 | Cargille et al. |
| 2005/0157757 | A1* | 7/2005 | Thudt ......................... 370/474 |
| 2005/0185604 | A1 | 8/2005 | Agarwal |
| 2005/0198350 | A1 | 9/2005 | Tan et al. |
| 2005/0223118 | A1* | 10/2005 | Tucker et al. ............... 709/250 |
| 2005/0238057 | A1* | 10/2005 | Toma et al. ................. 370/503 |
| 2006/0013258 | A1 | 1/2006 | Banerjee et al. |
| 2006/0047875 | A1 | 3/2006 | Aguilar, Jr. et al. |
| 2006/0064621 | A1 | 3/2006 | Fuh et al. |
| 2006/0136570 | A1 | 6/2006 | Pandya |
| 2006/0221953 | A1* | 10/2006 | Basso et al. ................. 370/389 |
| 2006/0259487 | A1 | 11/2006 | Havens et al. |
| 2006/0268688 | A1 | 11/2006 | Isozu |
| 2007/0291778 | A1 | 12/2007 | Huang et al. |
| 2007/0294426 | A1 | 12/2007 | Huang et al. |
| 2007/0299970 | A1 | 12/2007 | Huang et al. |

OTHER PUBLICATIONS

Written Opinion mailed Feb. 10, 2008, in corresponding International Application No. PCT/IB2006/004296, filed Oct. 17, 2006.
International Preliminary Report on Patentability mailed May 14, 2008, in corresponding International Application No. PCT/IB2006/004296, filed Oct. 17, 2006.
International Search Report issued in International Application No. PCT/US2007/071031, mailed Feb. 4, 2008.
Written Opinion issued in International Application No. PCT/US2007/071031, mailed Feb. 4, 2008.
International Preliminary Report on Patentability issued in International Application No. PCT/US2007/071031, mailed Dec. 22, 2008.
International Search Report issued in International Application No. PCT/US2007/071036, mailed Jun. 10, 2008.
Written Opinion issued in International Application No. PCT/US2007/071036, mailed Jun. 10, 2008.
International Preliminary Report on Patentability issued in International Application No. PCT/US2007/071038, mailed Dec. 22, 2008.
International Search Report issued in International Application No. PCT/US2007/071038, mailed Aug. 21, 2008.
Written Opinion issued in International Application No. PCT/US2007/071038, mailed Aug. 21, 2008.
International Preliminary Report on Patentability issued in International Application No. PCT/US2007/071040, mailed Dec. 22, 2008.
International Search Report issued in International Application No. PCT/US2007/071040, mailed Oct. 1, 2008.
Written Opinion issued in International Application No. PCT/US2007/071040, mailed Oct. 1, 2008.
"Message Passing Interface (MPI)", http://www.llnl.gov.computing/tutorials/mpi, printed Mar. 8, 2007.
"GASNet Specification", Version 1.8, Released Nov. 2, 2006, Editor: Dan Bonachea, bonacheas@cs.berkeley.edu, http://gasnet.cs.berkely.edu.
International Search Report issued in International Application No. PCT/US2007/079102, mailed Apr. 10, 2008.
Written Opinion issued in International Application No. PCT/US2007/079102, mailed Apr. 10, 2008.
Michael M. Swift et al., "Improving the Reliability of Commodity Operating Systems", SOSP '03, Bolton Landing, New York, USA, Oct. 19-22, 2003 (16 pages).
Citation of Michael M. Swift et al., "Improving the Reliablity of Commodity Operating Systems", ACM Transactions on Computers Systems (TOCS), vol. 23, Issue 1; pp. 77-110, Feb. 2005 (8 pages).
UPC Consortium, "UPC Language Specficiation V1.2", pp. 1-129, May 31, 2005.
Linux Kernel Development Second Edition by Robert Love, ISBN: 0672327201, "Chapter 4. Process Scheduling", pp. 1-19, Jan. 12, 2005.
Information Sciences Institute, "Transmission Control Protocol, DARPA Internet Program, Protocol Specification, Sep. 1981", pp. i-85.
"MPI: A Message-Passing Interface Standard: Message Passing Interface Forum", Nov. 15, 2003 (239 pages).
Office Action issued in U.S. Appl. No. 11/761,885, mailed Sep. 17, 2008.
Office Action issued in U.S. Appl. No. 11/761,885, mailed Feb. 4, 2009.
Office Action issued in U.S. Appl. No. 11/761,885, mailed Aug. 24, 2009.
Office Action issued in U.S. Appl. No. 11/761,804, mailed Aug. 22, 2008.
Office Action issued in U.S. Appl. No. 11/761,804, mailed Jan. 8, 2009.
Notice of Allowance issued in U.S. Appl. No. 11/761,804, mailed Aug. 7, 2009.
Office Action issued in U.S. Appl. No. 11/761,827, mailed October 5, 2009.
Office Action issued in U.S. Appl. No. 11/761,885, mailed Dec. 23, 2009.
Jiuxing Liu et al., MPI OVer InfiniBand: Early Experiences;, Network-Based Computing Laboratory Computer and Information Science, Ohio State University, Aug. 2003, 16 pages.
Notice of Allowance issued in U.S. Appl. No. 11/761,840, mailed Dec. 14, 2009.
Office Action issued in U.S. Appl. No. 11/761,865, mailed Dec. 11, 2009.

* cited by examiner

HIGH PERFORMANCE MEMORY BASED COMMUNICATIONS INTERFACE

BACKGROUND OF THE INVENTION

1. Field of the Invention

Embodiments of the present invention relate to high performance memory based communications interfaces. In particular, embodiments of the present invention relate to methods and systems for reducing or eliminating the communications bottleneck between multi-processor computing systems and communication networks.

2. Description of the Prior Art and Related Information

The ever-growing need for computational performance is being satisfied by increasingly powerful commercial processors, and topologies that combine a plurality of processors around a communications network. To effectively utilize the power of such a system, especially where application software that is running concurrently on the processors needs to interact with each other, requires the use of an appropriate communications network. To date, the power of processors has outpaced the advances of communication network implementations, causing a bottleneck in the performance of applications.

Parallel applications typically interwork through an intermediary layer of software that abstracts the specifics of the underlying networks. These software layers may be, for example, a communications focused protocol stack (e.g. Transmission Control Protocol/Internet Protocol—TCP/IP) or a library (e.g. Message Passing Interface—MPI) which may include both communications and value added services. Communication network implementations include network switching (which transmit network level entities to their destinations), network endpoint processing (which provide the network transmit and network receive functions on behalf of the host) and communications endpoint processing (which provide efficient writing and reading of data to/from memory, interface to/from the network endpoint processors, synchronization of the data with workloads, and providing quality of service guarantees to workloads).

The computational domain is primarily designed for functional richness (support for Operating Systems—OS, Libraries, Application Program Interfaces—API's, multi-threading etc), whereas the communications domain is primarily designed for simplicity, throughput and low latency. The computational domain is typically software based and the communications domain is primarily hardware based (although this is not always the case). The interfacing of these two domains may cause performance bottlenecks.

Conventional methods and systems for addressing the interface between the computational and communications domain have been characterized by a number of initiatives for high-performance networking. The most dominant approach is Ethernet. Ethernet solutions include Ethernet switches and host NICs (Network Interface Controller) that may include switch endpoint and communications endpoint functions. Ethernet communications solutions have evolved with respect to bandwidth (as of this writing, [10 Gbs Ethernet] 10GE is emerging and the Institute of Electrical and Electronics Engineers [IEEE] is looking at 40 Gbs Ethernet rates as a next step), and with respect to functionality. Ethernet networks use a NIC to map frames in main processor memory to the network. They incorporate a Direct Memory Access (DMA) controller, but this typically is limited to sending a frame (or packet) at a time for transmission to the network. Ethernet with Hardware Offload Acceleration extends the Ethernet capability by adding support for TCP and RDMA (Remote DMA) protocols on top of the core Ethernet. Importantly, this protocol still only sends one fame (or packet) at a time. The latest NICs have included TCP offload, Direct Memory Access (DMA), Remote Direct Memory Access (RDMA), and Internet SCSI (Small Computer System Interface) (iSCSI) hardware support. Software maps the services to standards based TCP communications.

Asynchronous Transfer Mode (ATM) has a variety of NIC's and Switches, with software to adapt standards based interfaces to the ATM network. ATM is not being evolved as a significant computer interconnect technology. With ATM, the frame is typically transmitted as a packet to the ATM NIC where it is stored in local memory and Segment Assembly and Reassembly (SAR) functions are performed.

Infiniband is a computer industry initiative aimed to provide high performance interconnect. Infiniband is a whole cloth solution providing, switches, Host Channel Adapters, interface software and standards based software mapping. Indeed, Infiniband defines an interface between computer memory and a high performance network. The Infiniband Architecture (IBA) includes an industry defined specification that defines the Meta Architecture of Infiniband. At the architecture specification level, there are differences in the methods used to map the data queues to applications. The implementation of IBA has been limited due to a lack of acceptance of this architecture outside of high performance applications. There are a number of vendors that provide Infiniband hardware and software components.

There are also a number of other proprietary hardware interface devices and switches that, when combined with appropriate software, may be used for computer communications. Such communication switches are typically used for data communications and have a rich set of "quality of service" attributes. They are typically packet oriented and the interface device receives packets over an electrical bus and the device performs internal segmentation and storage in local memory.

Due to the shortcomings of the existing solutions, more efficient systems and methods need to be developed to reduce or eliminate the communications bottleneck between multi-processor computing systems and communication networks.

SUMMARY OF THE CLAIMED EMBODIMENTS

Accordingly, an embodiment of the present invention is a method for transmitting a data packet including a header and a payload to a communications medium. The method may include steps of segmenting the data packet into a plurality of fragments stored in non-contiguous portions of a computer memory; generating a fragment descriptor for each of the plurality of fragments such that one of the generated fragment descriptors is associated with the header and at least one other of the generated fragment descriptors is associated with the payload; storing the generated fragment descriptors in contiguous portions of the computer memory; sending the stored plurality of fragment descriptors across an interface; retrieving the sent fragment descriptors from the interface; reassembling the segmented data packet by retrieving the header and the payload associated with the retrieved fragment descriptors from the computer memory, and transmitting the reassembled data packet to the communications medium.

The segmenting, generating, storing and sending steps may be carried out by a communications endpoint processor (CEP) kernel. The segmenting, storing and sending steps may be carried out in protected kernel space. The segmenting, storing and sending steps may be carried out in user space. At least some of the functionality of the CEP kernel may be carried out by software. The retrieving, reassembling and transmitting steps may be carried out by a CEP engine. At least some of the functionality of the CEP engine may be carried out by hardware. The segmenting step may be carried out such that each fragment descriptor includes a data structure that defines the physical address in the computer memory of its corresponding fragment. The segmenting step may be carried out such that each fragment descriptor includes, for example, a pointer to the physical address in the computer memory of its corresponding fragment, a length field indicating a length in bytes of its corresponding fragment, a flag field indicating whether its corresponding fragment is a last fragment of the payload, and an instance ID field. The segmenting step may be carried out such that each fragment descriptor of each fragment into which the data packet is segmented stores a same instance ID in the instance ID field. The method may further include a step of generating a segment descriptor that is associated with all of the fragment descriptors of the fragments into which the data packet is segmented. The segmenting step may be carried out with the data packet being categorized into a medium data packet whose size is less than or equal to a predetermined maximum size or into a large data packet whose size exceeds the predetermined maximum size. The segmenting step may segment the large data packet into at least two segments whose size is equal to or less than the predetermined maximum size. Each of the at least two segments may be associated with a respective segment descriptor and each of the at least two segments may include a same header and a plurality of fragments, the header and the plurality of fragments each being associated with a respective fragment descriptor. The segmenting step may include a chaining step to chain the respective segment descriptors associated with the at least two segments. The chaining step may include generating a first segment chain descriptor that includes a start address field configured to store a start address of a first fragment descriptor of a first fragment of a first one of the at least two segments and at least one second segment chain descriptor between other ones of the at least two segments. Each respective segment descriptor may include an instance ID field and the segmenting step may include storing unique and sequentially numbered instance IDs in the respective instance ID fields.

According to another embodiment, the present invention is a computer communications interface for transmitting a data packet that includes a header and a payload to a communications medium. The computer communications interface may include a communications endpoint processor (CEP) interface; a CEP kernel coupled to the CEP interface, the CEP kernel being configured to segment the data packet into a plurality of fragments, to store the plurality of fragments in non-contiguous portions of a computer memory, to generate a fragment descriptor for each of the plurality of fragments such that one of the generated fragment descriptors is associated with the header and at least one other of the generated fragment descriptors is associated with the payload, to store the generated fragment descriptors in contiguous portions of the computer memory and to send the stored plurality of fragment descriptors across the CEP interface, and a CEP engine coupled to the CEP interface, the CEP engine being configured to retrieve the fragment descriptors from the interface, to reassemble the segmented data packet by retrieving the header and the payload associated with the retrieved fragment descriptors from the computer memory, and to transmit the reassembled data packet to the communications medium.

At least some of the functionality of the CEP kernel may be implemented in software. At least some of the functionality of the CEP engine may be implemented in hardware. The CEP kernel may be configured to segment the data packet into a plurality of fragments such that each fragment descriptor includes a data structure that defines the physical address in the computer memory of its corresponding fragment. The CEP kernel may be further configured to segment the data packet into a plurality of fragments such that each fragment descriptor includes, for example, a pointer to the physical address in the computer memory of its corresponding fragment, a length field indicating a length in bytes of its corresponding fragment, a flag field indicating whether its corresponding fragment is the last fragment of the payload and an instance ID field. The CEP kernel may be further configured to segment the data packet into a plurality of fragments such that each fragment descriptor of each fragment into which the data packet is segmented stores a same instance ID in the instance ID field. The CEP kernel may be further configured to generate a segment descriptor that is associated with all of the fragment descriptors of the fragments into which the data packet is segmented. The data packet may be categorized into a medium data packet whose size is less than a predetermined maximum size or into a large data packet whose size exceeds the predetermined maximum size. The CEP kernel may be further configured to segment the data packet such that the large data packet is segmented into at least two segments whose size is equal to or less than the predetermined maximum size. Each of the at least two segments may be associated with a respective segment descriptor and each of the at least two segments may include a same header and a plurality of fragments, the header and the plurality of fragments each being associated with a respective fragment descriptor. The CEP kernel may be further configured to chain the respective segment descriptors associated with the at least two segments. The CEP kernel may be further configured to generate a first segment chain descriptor that includes a start address field configured to store a start address of a first fragment descriptor of a first fragment of a first one of the at least two segments and at least one second segment chain descriptor between other ones of the at least two segments. Each respective segment descriptor may include an instance ID field and the segmenting step may include storing unique and sequentially numbered instance IDs in the respective instance ID fields. The CEP kernel may run in protected kernel space. The CEP kernel may run in user space.

Yet another embodiment of the present invention is a method for a local computational host to communicate with a remote computational host, the local and remote computational hosts each comprising an operating system, a workload; a communication endpoint processor (CEP) kernel coupled to the workload over an interface and a CEP engine coupled to the CEP kernel over a CEP engine interface. The method may include steps of the local workload invoking a one sided remote memory operation across the interface to the local CEP kernel; the local CEP kernel constructing a memory operation command; the local CEP kernel sending the constructed memory operation command across a local CEP kernel to remote CEP engine protocol; the remote CEP engine consuming and executing the sent memory operation command without invoking services of the remote CEP kernel, the remote workload or of the remote operating system, and the local CEP engine receiving a result of the executed memory operation command or a confirmation that the sent memory operation command has been carried out.

The constructing step may be carried out with the memory operation command being, for example, a remote read command; a remote posted write command; a remote non posted write, a remote read-modify-write, a remote DMA read, or a remote DMA write.

The present invention, according to another embodiment thereof, is a method for optimizing a data packet in a high performance computer system. Such a method may include steps of preparing a payload of the data packet; passing the prepared payload to a communications endpoint processor (CEP) kernel; appending, by the CEP kernel, a header to the prepared payload to generate a CEP kernel protocol unit that may be optimized for a processor environment; transmitting, by the CEP kernel, the CEP kernel protocol unit to a CEP driver that is optimized for high throughput and low latency, and transforming, by the CEP driver, the transmitted CEP kernel protocol unit into one of a plurality of CEP kernel protocol unit formats depending upon the size range of the payload, each of the plurality having a different format for efficient handling by a CEP engine that is configured to automate communication tasks and to interface to a system memory controller for direct memory operations.

The size range of the payload corresponding to each of the plurality of CEP kernel protocol units may be programmable. The transforming step may transform the CEP kernel protocol unit into a medium size CEP kernel format, a large CEP kernel format or a small CEP kernel format. The transforming step may be carried out independently of the CEP kernel. The transforming step may include a step of representing the medium size CEP kernel format of the CEP kernel protocol unit in a segment descriptor that includes a definition of the physical address of all memory locations at which the data packet is stored. The segment descriptor may include an ordered plurality of fragment descriptors, each of the plurality of fragment descriptors corresponding to a fragment that contains a portion of the payload and defining a physical memory location of its corresponding fragment. The plurality of fragment descriptors may be stored in order in consecutive physical memory space. The transforming step may include transmitting, to the CEP engine, a first data structure containing a virtual address in memory of the header, and at least one second data structure containing a virtual address in memory of the payload.

The method may further include steps of transmitting, by the CEP driver, the first and the at least one second data structure to the CEP engine, and retrieving the header and payload from the memory using the transmitted first and at least one second data structure. The transforming step may transform the CEP kernel protocol unit into the large CEP kernel format when the payload is larger than the largest packet size that is optimal for transmission through a communication system of the high performance computer system. The transforming step may transform the CEP kernel protocol unit into the large CEP kernel format by segmenting the payload into a plurality of segments, all but a last one of the plurality of segments being of a size that is equal to or less than the largest packet size. The transforming step may transform the CEP kernel protocol unit into the small size CEP kernel format and the method further may include a step of copying the payload into a sequential physical memory segment of a main memory of the high performance computer system. The transforming step may generate a single fragment descriptor that includes a physical memory location of the payload and the method further may include a step of transmitting the single fragment descriptor to the CEP engine. The transforming step may transform the CEP kernel protocol unit into the small size CEP kernel format and may copy the payload directly into the memory coupled to the CEP engine to which the CEP engine has direct access. The memory coupled to the CEP engine may include a memory mapped packet output queue. The method may further include the steps of providing the CEP engine with a descriptor output queue that is configured as a memory mapped FIFO and the CEP driver transmitting the transformed CEP kernel protocol unit to the descriptor output queue. The method may also include steps of providing the CEP engine with a memory mapped descriptor output queue ready register, and the CEP driver writing to the descriptor output queue ready register when descriptors for at least a portion of the transformed CEP kernel protocol unit have been written to the descriptor output queue. After the writing step, the method may further include a step of the CEP engine performing a descriptor output queue input operation to accept the descriptors written to the descriptor output queue. The method may also include a step of the CEP driver including, in one of the descriptors to be written to the descriptor output queue, an indication that descriptors for a CEP kernel protocol unit previously written to the descriptor output queue are ready for the CEP engine to remove from the descriptor output queue.

DETAILED DESCRIPTION

Herein, the combination of the application and any library or communications protocol associated with the application is collectively referred to as a "workload". Underneath the workload, there may be provided a set of communication functions that operate to cooperatively provide the workload with the required communication services between its collaborative peers.

Embodiments of the present invention address a set of functionalities and components within a communication endpoint processor (CEP) that acts as an interface between the computational and communications domains. The embodiments disclosed herein deliver a complete memory mapped high performance interface that has the ability to support the simultaneous transmission of multiple frames, and that has the ability to interrupt the transmission of lower priority frames in order to send comparatively higher priority frames.

Figure 1:
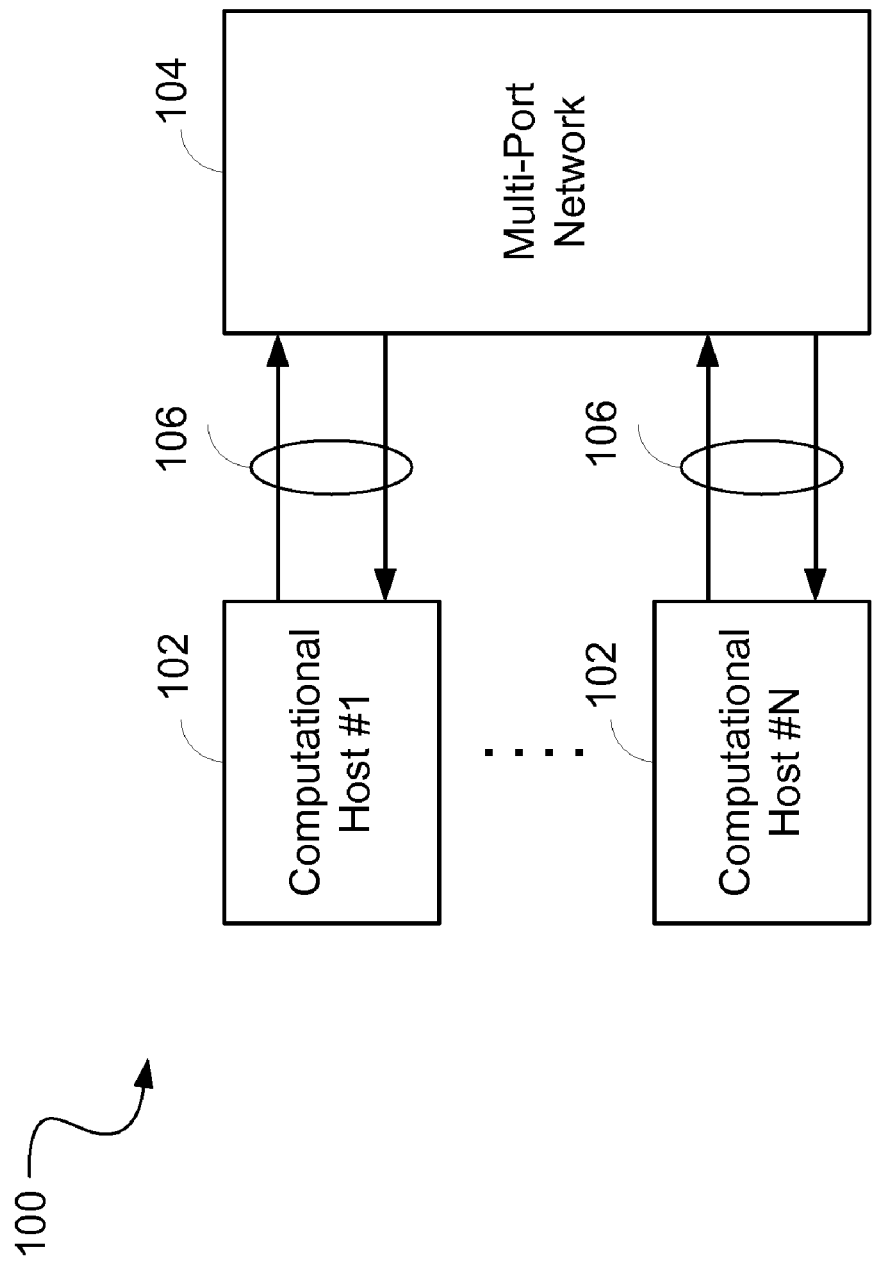
FIG. 1 shows a network 100 including a plurality of computational hosts 102 that may each include one or more processors, according to an embodiment of the present invention.

FIG. 1 shows a network 100 including a plurality of computational hosts 102 that may each include one or more processors, according to an embodiment of the present invention. Each computational host 102 may include one or more processors that may operate in several modes. Such modes may include (but are not limited to) an independent operating mode, a mode in which the processor(s) operate as a cache coherent region known as SMP (Symmetric Multi-Processor), or a mode in which the processor(s) operate as ccNUMA (Cache Coherent Non-Uniform Memory Architecture). A multi-port network 104 may provide connectivity between the computational hosts 102, each of which is connected to the multi-port network 104 with a link 106.

Computational Host and Communication Endpoints

Figure 2:
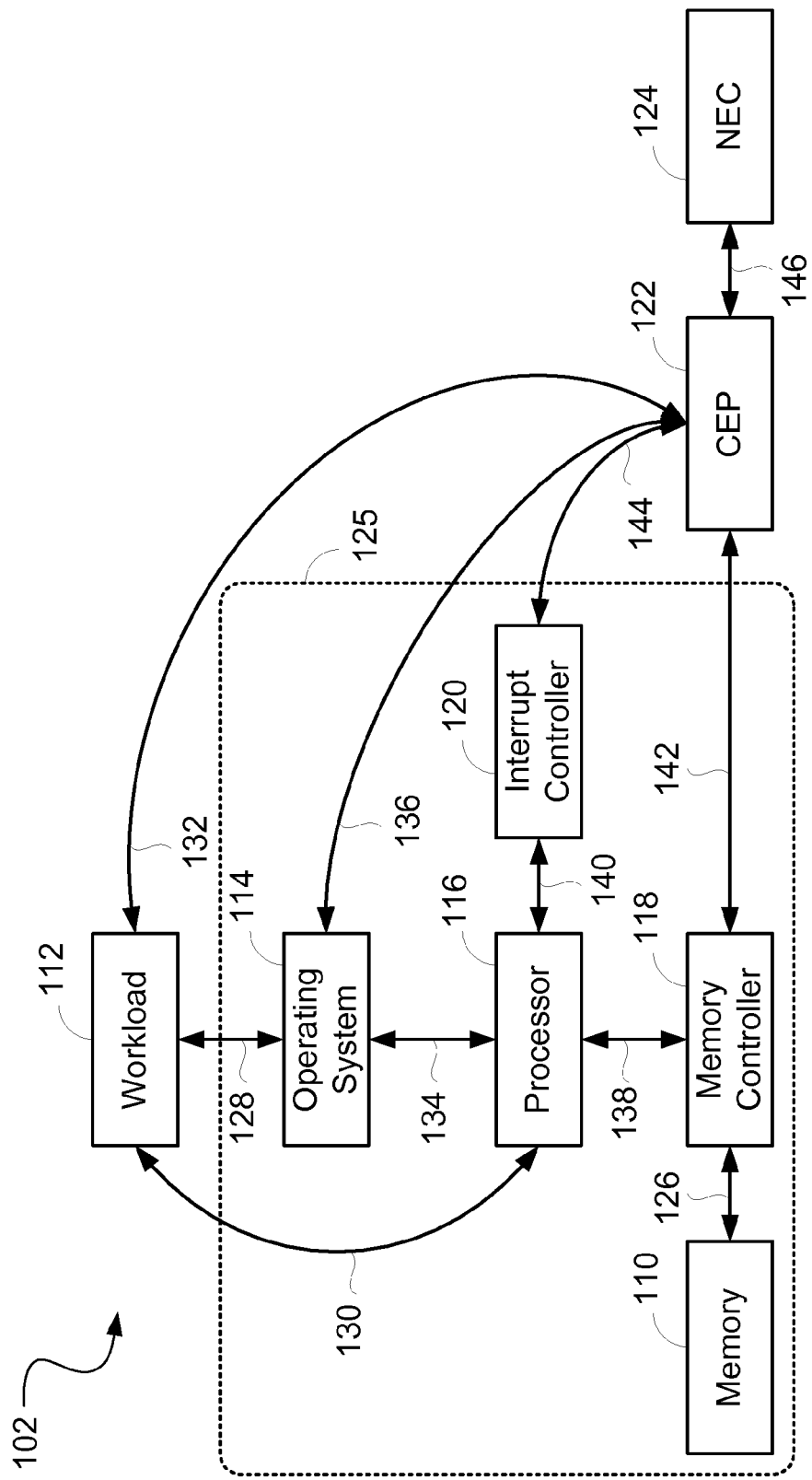
FIG. 2 shows the elements that may be included in the computational host 102 of FIG. 1, according to an embodiment of the present invention.

FIG. 2 depicts the elements that may be included in each of the computational hosts 102 of FIG. 1. As shown, each computational host 102 may include a memory 110; a workload 112; an operating system 114; a processor 116 (or more than one such processors 116); a memory controller 118; an interrupt controller 120; a communications endpoint processor (CEP) 122; and a network endpoint controller (NEC) 124. Note that while the block diagram of FIG. 2 shows the constituent elements of a representative computational host 102, actual implementations thereof may vary with respect to the number of memory controllers 110 and the number of processors 116, for example. The workload 112 may include one or multiple applications with one or multiple libraries to support the parallel algorithm operation. Within the computational host 102, a set of "Compute Host System Components" 125 (system components) includes the operating system 114, the processor 116, the memory 110, the memory controller 118, and the interrupt controller 120. The system components 125 include a standard set of hardware and software based services to deliver a computational environment. The system components 125 may include commercially available technologies, or one or more of the system components 125 may be proprietary for delivering specific value. The Communications Endpoint Processor (CEP) 122 may provide all of the functionality required to transmit and receive data on behalf of the workload 112 across any communications network, to and from other computational nodes (computational hosts 102). The data may represent two-sided messages or commands between cooperating workloads 112 in distributed (computational) hosts 102. In addition, the data may represent one-sided remote memory operations from one workload 112 to perform memory operation in a remote host location without any support from the remote host's workload 112, operating system 114, or CEP 122 support software. The Network Endpoint Controller (NEC) 124 may provide all of the functionality to transmit and receive data across a network (e.g. the multi-port network 104 of FIG. 1). Functional relationships (interfaces) between the elements that make up the computational host 102, are shown in FIG. 2 in the form of double-ended arrows, including:

an interface 126 between the memory 110 and the memory controller 118;

an interface 128 between the workload 112 and the operating system 114;

an interface 130 between the workload 112 and the processor 116;

an interface 132 between the workload 112 and the CEP 122;

an interface 134 between operating system 114 and the processor 116;

an interface 136 between operating system 114 and the CEP 122;

an interface 138 between the processor 116 and the memory controller 118;

an interface 140 between the processor 116 and the interrupt controller 120;

an interface 142 between the memory controller 118 and the CEP 122;

an interface 144 between the interrupt controller 120 and the CEP 122; and an interface 146 between the CEP 122 and the NEC 124.

Figure 3:
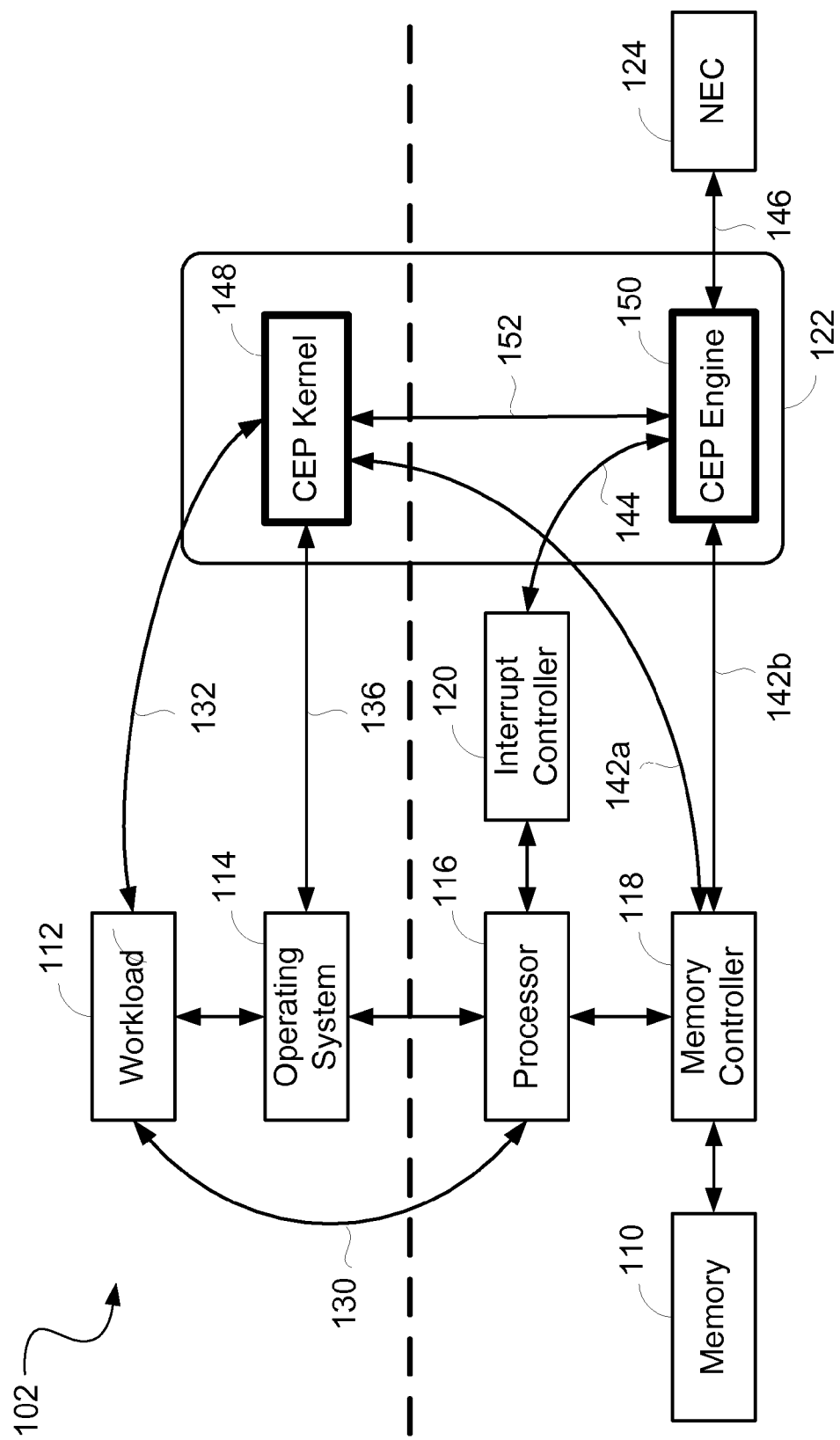
FIG. 3 shows the elements that may be included in the computational host 102 of FIG. 2, including a decomposition of the Communications Endpoint Processor (CEP) 122 of FIG. 2 into a CEP Kernel 148 and a CEP engine 150, to show internal functional blocks and interfaces thereof, according to an embodiment of the present invention.

FIG. 3 shows elements that may be included in the computational host 102 (of FIG. 1), including a decomposition of the CEP 122 of FIG. 2 to show internal functional blocks and interfaces thereof, according to an embodiment of the present invention. As shown in FIG. 3, the CEP 122 may be partitioned into 2 main blocks; namely, a CEP kernel 148 and a CEP engine 150, linked by a CEP engine interface 152. The CEP kernel 148 may be configured to be responsible for interfacing to the workload, end-to-end protocol management between peer CEP kernel entities in remote hosts, and for managing the CEP engine interface 152. The CEP engine 150 may provide high performance automation of communication tasks and direct interfacing to the system memory controller 118 for direct memory operations. FIG. 3 further shows the association of the CEP interfaces (132, 136, 142, 144, 146 of FIG. 2) with the other elements of the computational host 102, connecting to the CEP kernel 148 and the CEP engine 150 as follows:

interface 132 between the workload 112 and the CEP kernel 148;

interface 136 between operating system 114 and the CEP kernel 148;

interface 142 between the memory controller 118 and the CEP 122 is split into two interfaces, interface 142a to the CEP kernel 148 and interface 142b to the CEP engine 150;

interface 144 between the interrupt controller 120 and the CEP engine 150; and interface 146 between the CEP engine 150 and the NEC 124.

The workload 112 may contain one or more libraries. The lowest layer of the libraries may be modified to optimally suit the target environment. For a CEP implementation, the libraries may be modified to interface to the CEP kernel 148 directly for highest performance (through the interface 132). The workload libraries may communicate with the CEP kernel 148 through an operating system call or via OS bypass capabilities, for example (through the interface 132). The CEP engine 150 may provide the functionally to manage end-to-end data transfer services, interface to the network endpoint controller (NEC) 124 (through the interface 146) and to efficiently interface to the system memory (through the interface 142b and the memory controller 118), the CEP kernel 148 (through the interface 152), and the interrupt controller 120 (through the interface 144). The dotted line in FIG. 3 shows the primary partitioning between hardware and software implementations, according to an embodiment of the present invention. For example, the CEP kernel 148 may be primarily software based, and the CEP engine 150 may be primarily hardware based for performance. However, the CEP engine 150 may include some software and (some) CEP kernel 148 functions may be targeted to hardware. That is to say, embodiments of the present invention are not limited by any rigid partitioning between hardware and software, because the partitioning between hardware and software implementations of the CEP engine 150 and of the CEP kernel 148 and other structures and functionalities disclosed herein may evolve over time as the underlining technology evolves. The interface 142a is included in FIG. 3 to show a possible standard read/write interface to system memory for software running on a processor.

Concurrent Parallel Distributed Communications Functions & Interfaces

Parallel workloads on distributed hosts communicate across the network for interactive collaboration of their algorithms. Embodiments of the present invention support two communication models: two-sided and one-sided communications. Two-sided communications may occur where both hosts collaborate to complete the communications tasks. One-sided communications may occur where a workload on one side of the communications network performs direct memory operations on the remote host without the collaboration of the remote host (either at the workload, operating system, or communications protocol level). For one-sided operation, both sides preferably should have pre-exchanged information on remotely accessible memory regions and established permissions and security keys.

Figure 4:
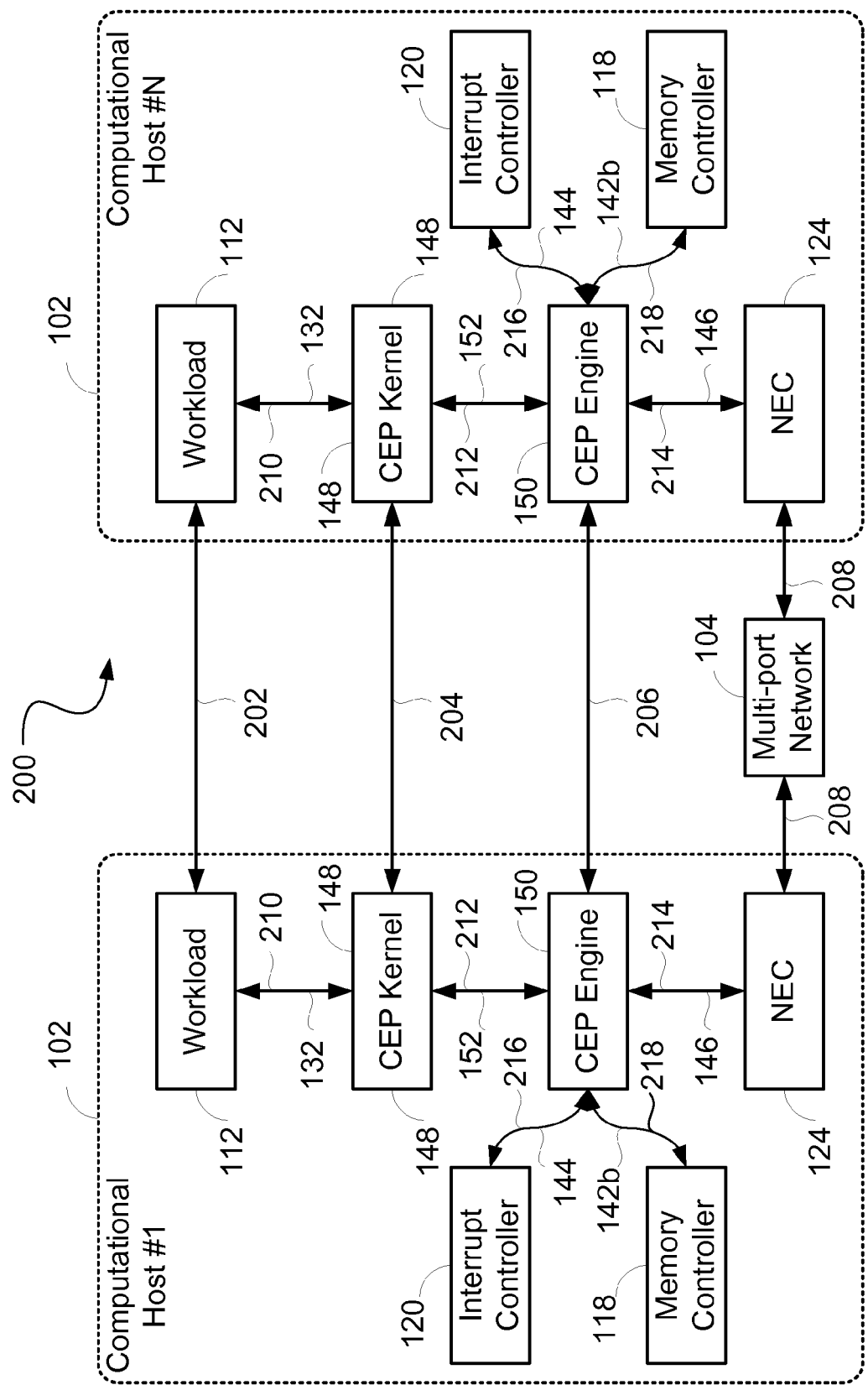
FIG. 4 shows a communications architecture 200 from the perspective of two-sided communications across a communication network, according to an embodiment of the present invention.

FIG. 4 depicts a communications architecture 200 from the perspective of two-sided communications across a communication network (e.g. the multi-port network 104 of FIG. 1) between two hosts (the computational hosts 102, #1 and #N respectively), according to an embodiment of the present invention. In FIG. 4, each of the hosts 102 is expanded to show the following elements from FIG. 3: the workload 112; the CEP 122 (decomposed into the CEP kernel 148 and the CEP engine 150); the NEC 124; the interrupt controller 120; and the memory controller 118, together with their respective interfaces. With reference to FIG. 4, the workloads 112 may communicate with each other using the services of the underlying CEP 122 (i.e. the CEP Kernel 148 and the CEP Engine 150) and communication network functions (the NECs 124); the CEP kernel 148 may communicate with one or multiple CEP kernels 148 each running on remote computational hosts, to provide operational and/or administrative data transfer services and the CEP engine 150 may provide for hardware driven data transfer service across a communications network (e.g. the multi-port network 104). End-to-end protocols may be provided to enable the CEP engines 150 to communicate with each other to maintain integrity of specific services.

In FIG. 4, reference numerals 202 to 206 represent peer-to-peer communications protocols that operate over the network:

a workload to workload protocol 202;

a CEP kernel end-to-end protocol 204; and a CEP engine end-to-end protocol 206.

The protocols may be configured to carry messages that span all aspects of the communications session, including operational messages and commands and administrative state control. Reference numeral 208 denotes a network access protocol; reference numerals 210-214 represent Application Program Interfaces (APIs) and services provided between functional layers within each host (corresponding to the interfaces 132, 152, and 146 respectively), and reference numerals 216 (corresponding to the interface 144) and 218 (corresponding to the interface 142b) denote direct or semi-direct hardware access to the interrupt controller and to memory, respectively.

Figure 5:
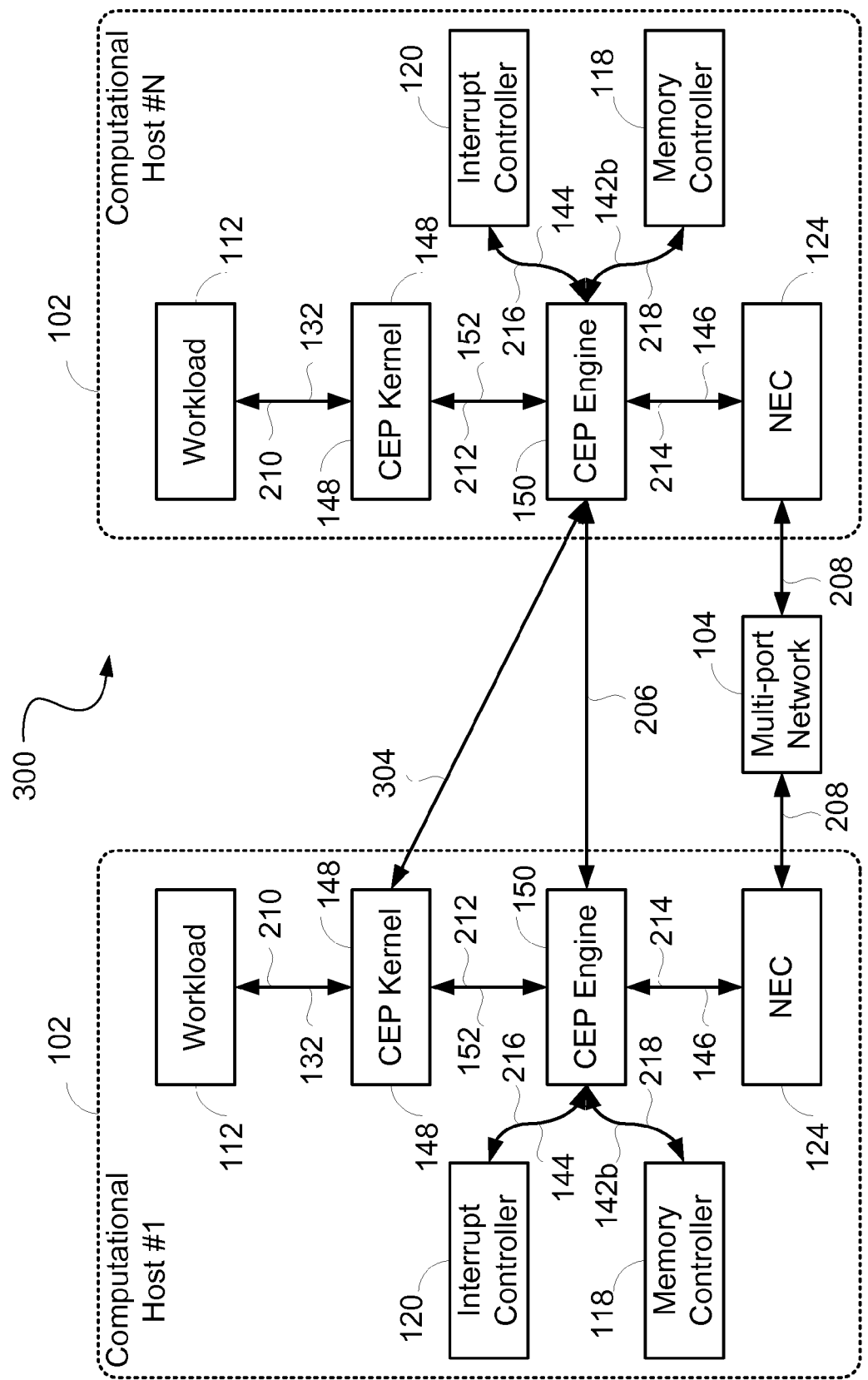
FIG. 5 shows a communications architecture 300 with functions for one-sided communications across a communication network, according to an embodiment of the present invention.

FIG. 5 shows a communications architecture 300 with functions for one-sided communications across a communication network, according to an embodiment of the present invention. FIG. 5 is analogous to FIG. 4, but the two-sided protocols 202 (workload to workload) and 204 (CEP Kernel end-to-end) are replaced by a "local-CEP kernel to remote-CEP engine" protocol 304. The local workload 112 (in the computational host #1) may perform one-sided memory operations on a remote host (the computational host #N), through the local CEP kernel 148 which may communicate directly with the remote CEP Engine 150 using the "local-CEP kernel to remote-CEP engine" protocol 304 (a logical interface). Such memory operations may include (but are not limited to) commands that carry out the following, without limitation:

Remote read (byte, word, double word . . . );

Remote posted write (byte, word, double word . . . );

Remote non posted write (byte, word, double word . . . );

Remote read-modify-write (byte, word, double word . . . );

Remote DMA read (remote address-range, local address), and

Remote DMA write (local address-range, remote address).

The local workload 112 may invoke the one-sided remote memory operation across the interface 132 (the API 210) to the local CEP kernel 148. The local CEP kernel 148 may then construct the command, which may then be communicated to the remote CEP engine 150 across the logical interface 304. Physically, the local CEP kernel 148 may invoke the remote operation via the local CEP engine 150 (using the interface 152/212) and the CEP engine end-to-end protocol 206. The remote CEP engine 150 may then consume and carry out the remote memory command without invoking the services of the remote CEP kernel 148 or the remote workload 112. Note that an option may be set by the local host initiating the remote memory operation to interrupt the far end. The single sided remote DMA describes the data path. It is understood that end to end synchronization of user memory locations, and permissions are needed but are not described in this document.

Communications Endpoint Kernel to Communications Endpoint Engine Interface

There are many aspects that may impact the overall performance of the system. One such aspect is the interface between the CEP kernel 148 and the CEP engine 150 (the interface 152 in FIGS. 3, 4 and 5). The CEP kernel 148 may interface to the CEP engine 150 in at least two ways. For two-sided communications, the CEP kernel 148 may hand off CEP protocol units to the CEP engine 150 for delivery to remote hosts. The CEP kernel 148 may also receive CEP protocol units from the CEP engine 150 that have been sent by remote hosts. For single-sided communications, the (local) CEP kernel 148 may utilize the (local) CEP engine 150 to deliver the remote memory commands to the associated CEP engine 150 on the relevant remote host, and the remote memory operation may take place without the assistance of the remote CEP kernel 148, remote operating system, or the remote workload 112. The only information received from the local CEP engine 150 will be results (if any) from the single sided command (e.g. this could be delivery confirmation or confirmation that the requested read data has been placed in the assigned buffer).

Figure 6:
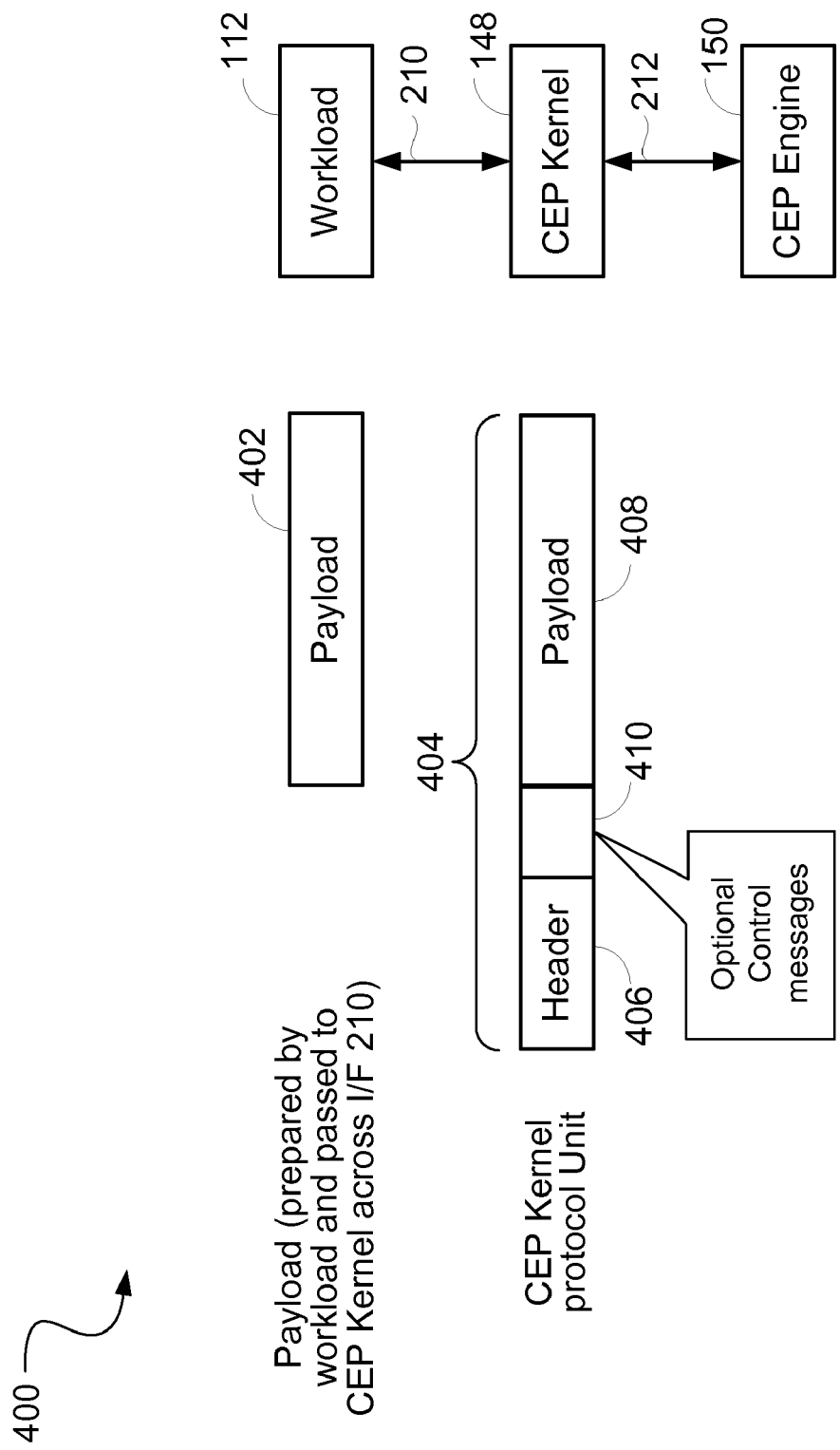
FIG. 6 shows an example of a CEP kernel protocol 400 and its relationship to a user payload and to the embodiment functions, according to an embodiment of the present invention.

FIG. 6 depicts a CEP kernel protocol 400 including a user payload 402 and a CEP-kernel protocol unit 404, showing the relationship between the CEP kernel protocol 400 and the workload 112, the CEP kernel 148, and the CEP engine 150. The CEP-kernel protocol unit 404 (or packet) may include a CEP kernel header 406 and a payload 408 (which is equal to or may include the user payload 402). In order to facilitate end-to-end state management and control, the CEP kernel 148 may piggy-back CEP kernel messages 410 onto the protocol unit. The control data contained in the piggy-back CEP kernel messages 410 may also include commands to instruct the remote CEP-Engine 150 in single sided communications. In preparing a CEP-kernel protocol unit 404, the CEP kernel 148 may be given access to the user payload 402 through an API invoked by the workload 112 across the interface 210 (also shown in FIGS. 4 and 5). The CEP kernel 148 may then prepare the CEP protocol unit 404 and hand it off to the CEP engine 150 across the interface 212.

The following description is split into three sections:
1. A high level description of the CEP-kernel to CEP engine interface 212;
2. A detailed description of the data path, packet sizes, and core datapath data structures that provide an efficient representation of the packet to the CEP engine 150.
3. A description of control structures, in combination with an exemplary embodiment of the invention.

Interface Between the CEP Kernel and the CEP Engine

An important element of high performance communications is the interface between the software functions that operate within the processor environment (including but not limited to workloads, OS, memory management, APIs, communications protocols and interrupt services, for example), and the highly optimized methods and functions that provide the actual transmit and receive paths over the underlying communications network. According to embodiments of the present invention, the functions discharged by the CEP 122 may be split between the CEP kernel 148 and the CEP engine 150 (FIGS. 3 to 5) to better exploit optimal mapping to technology.

The CEP kernel 148 may be optimized to provide the CEP functionality that operates within the standard processor operating environment, and to provide optimized interfaces to those other functions that are accessed from within the standard processor environment.

The CEP engine 150 may also be optimized for low latency and high throughput communications over the underlying communications network. According to an embodiment of this invention, the CEP kernel 148 may be implemented as a software implementation in kernel space and the CEP engine 150 may be implemented as a Field Programmable Gate Array (FPGA) and/or an Application Specific Integrated Circuit (ASIC), for example. However, the selection of technology is not rigid and there are many options for target technology selection. These options will change as technology evolves or the services of the underlying communications network change, enabling lower cost and/or higher performance implementations The interface between the functionally rich software driven CEP kernel 148, with the highly optimized CEP engine 150, introduces some fundamental problems. The reason for this is because the CEP kernel protocol unit (or packet) 404, as shown in FIG. 6, may not be optimal for transmitting to a CEP engine 150 that is itself highly optimized for throughput and low latency. This is because highly optimized performance (advantageously implemented in hardware) and functional richness (advantageously implemented in software) do not always optimally fit into the same target technology. The CEP kernel 148 covers a wide range of use cases and to build the functionally to handle the generic CEP kernel protocol unit 404 directly into the lowest level of CEP engine 150 either adds complexity, or compromises performance. In addition, the CEP kernel Protocol Data Unit (PDU) payload 408 may be located in virtual user memory space. Thus, it may not be contiguous and may be aligned with page boundaries that may be anywhere in memory. In addition, the CEP kernel protocol header 406 and any piggy backed control messages 410 may be in separate physical memory locations. Requiring the CEP engine 150 to be able to handle memory access at the virtual level may detract from performance and may add complexity to the implementation thereof. With operating systems that provide distinct user and kernel space, the workload 112 and (user) payload 402 may each be initially in user space, while the CEP kernel 148 may run in protected kernel space. The CEP kernel may run equally well in user space. Though the terminology of "user space" and "kernel space" is used herein, embodiments of the present invention work equally well with operating systems that run both user and special kernel functions in one mode.

Figure 7:
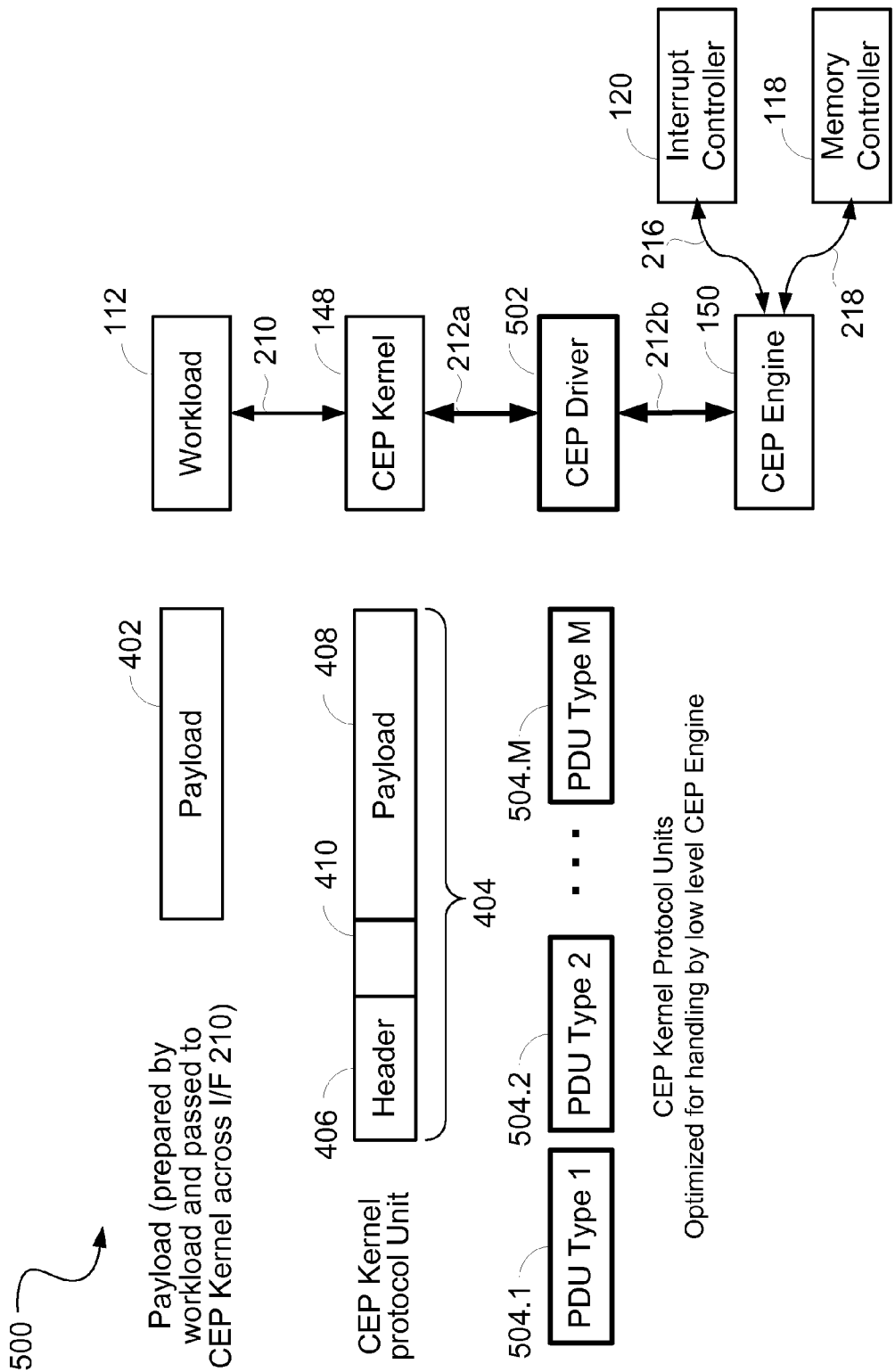
FIG. 7 shows a subdivided CEP kernel protocol 500, and an exemplary functionality of the interface between the CEP kernel 148 and the CEP engine 150 of FIG. 3, including a CEP Driver 502, according to an embodiment of the present invention.

To solve the problem described above, the functionality of the interface between the CEP kernel 148 and the CEP engine 150 (the interface 212) may be subdivided into two parts, as shown in FIG. 7. FIG. 7 depicts a subdivided CEP kernel protocol 500, similar to the CEP kernel protocol 400 of FIG. 6, replacing the interface 212 (of FIG. 6) with a CEP driver 502 and an interface 212a between the CEP kernel 148 and the CEP driver 502, and a further interface 212b between the CEP driver 502 and the CEP engine 150. In addition, FIG. 7 illustrates multiple CEP kernel protocol unit types (PDU types) 504 each representing a different message size-class and each optimized for handling by the low level CEP engine 150.

The subdivided CEP kernel to CEP engine interface (the interfaces 212a and 212b) may provide a more optimal mapping to technology. The CEP kernel 148 may provide all of the highly optimized services required in the processor environment and may produce a CEP kernel protocol unit 404, as shown in FIG. 7. The CEP kernel protocol unit 404 may then be transmitted to the CEP driver 502 over the interface 212a. The CEP engine 150 may be configured and highly optimized for throughput and low latency and may receive optimized variants of the CEP kernel protocol unit 404 (i.e. the CEP kernel protocol unit types 504) over the interface 212b, as shown in FIG. 7. The CEP driver 502 provides a mapping between the unified CEP kernel PDU 404 that may be ideal for the processor environment (interface 212a), to one that may be optimal for communicating with the CEP engine (150) implementation (interface 212b). As shown in FIG. 7, the CEP driver 502 may transform the CEP kernel PDU 404 into one of several PDU types 504, each of which may offer optimal performance for a range of CEP functionality and packet sizes. The number of PDU types need not be fixed and may expand as the set of services grow. The PDU types 504 may be communicated to the CEP engine 150 across the interface 212b. It is to be understood that the CEP driver 502 may be implemented in hardware, software or a combination of both. It may be co-located with the CEP kernel 148, the CEP engine 150, as a separate entity or as a combination or all three.

Datapath Packet Sizes and Data Structures Over the Interface 212b

A unified CEP kernel protocol unit may include a range of packet sizes, and the CEP kernel may be configured to work effectively at this level. However, for performance and complexity reasons (as described above), a unified CEP kernel protocol unit may not be optimal for handling by the CEP engine. Aspects of an embodiment of the present invention include methods for partitioning the unified CEP kernel protocol units 404 into multiple subset formats for efficient handling by the CEP engine 150 over the interface 212b. For exemplary and illustrative purposes only, three size ranges are defined herein for transferring CEP kernel data across the interface 212b (from the CEP Driver 502 to the CEP engine 150 in FIG. 7). These size ranges may be defined as (but not limited to) small packet (PDU Type 1, reference numeral 504.1), medium packet (PDU Type 2, reference numeral 504.2) and large packet (PDU Type M, reference numeral 504.M). The number of distinct methods for handling one or more ranges of packets sizes may depend on the results of a cost/benefits analysis. This may vary depending on the state-of-the-art of processor, system memory access times, ASIC/FPGA technology, memory interface method, communications network and the specific performance and cost targets, for example. These variables may change over time as technology and requirements change. The CEP kernel 122 may be most flexible when the size for each range is programmable, so that it may be tuned for maximum performance given the other parameters of the system. The use of different methods for handling small, medium and large packets has a major impact on performance. The methods for handling each size and the performance factors that may decide the optimum size, according to embodiments of the present invention, are described hereunder.

Medium Sized CEP Kernel Packets

A medium sized packet may be defined as being larger than a small sized packet, up to a bounded size. According to an embodiment of the present invention, the maximum size of a medium size packet is equivalent to a segment. The choice of segment size (and by definition maximum medium packet size) is a function of:

The MTU (Maximum Transfer Unit) of the network. A segment must be less than or equal to the maximum transfer unit supported by the communications network (e.g. the multi-port network 104 in FIG. 1). This is because if the segment is larger than the MTU, then an additional PDU Segment Assembly and Reassembly (SAR) function would be required to break the segment down to units that may be carried by the network;

The segment size may be defined as less than the MTU of the communications network. This would be done if there were performance advantages in the implementation. For example, a segment size may be defined that maps into a convenient buffer size at each end of the communications path, or is optimal for the characteristics of the communications network and The size of the medium packet may be defined to be greater than a small sized packet size, and less than or equal to the maximum segment size as determined above.

Having defined an embodiment in which the maximum size of the medium size packet is equal to one segment (subject to the conditions above), the following details an embodiment of a method of efficiently representing the segment to the CEP engine. Note that the medium packet may include a user payload that may be defined by a virtual memory address, a CEP kernel header that may be also defined by a virtual memory address, and potentially a control message that may be piggy backed onto the packet, also defined by a virtual memory address. The CEP engine 150 may be given the three virtual addresses to get the packet header and user payload from memory. However, this may be very time consuming and may not meet performance targets. For example, the virtual to physical address mapping takes time, and if the virtual address is not in the Translation Look-aside Buffer (TLB) of the host computer which acts as an address translation cache, it may take even more time as an additional memory read may be required to obtain the appropriate translation tables from main memory.

Figure 8:
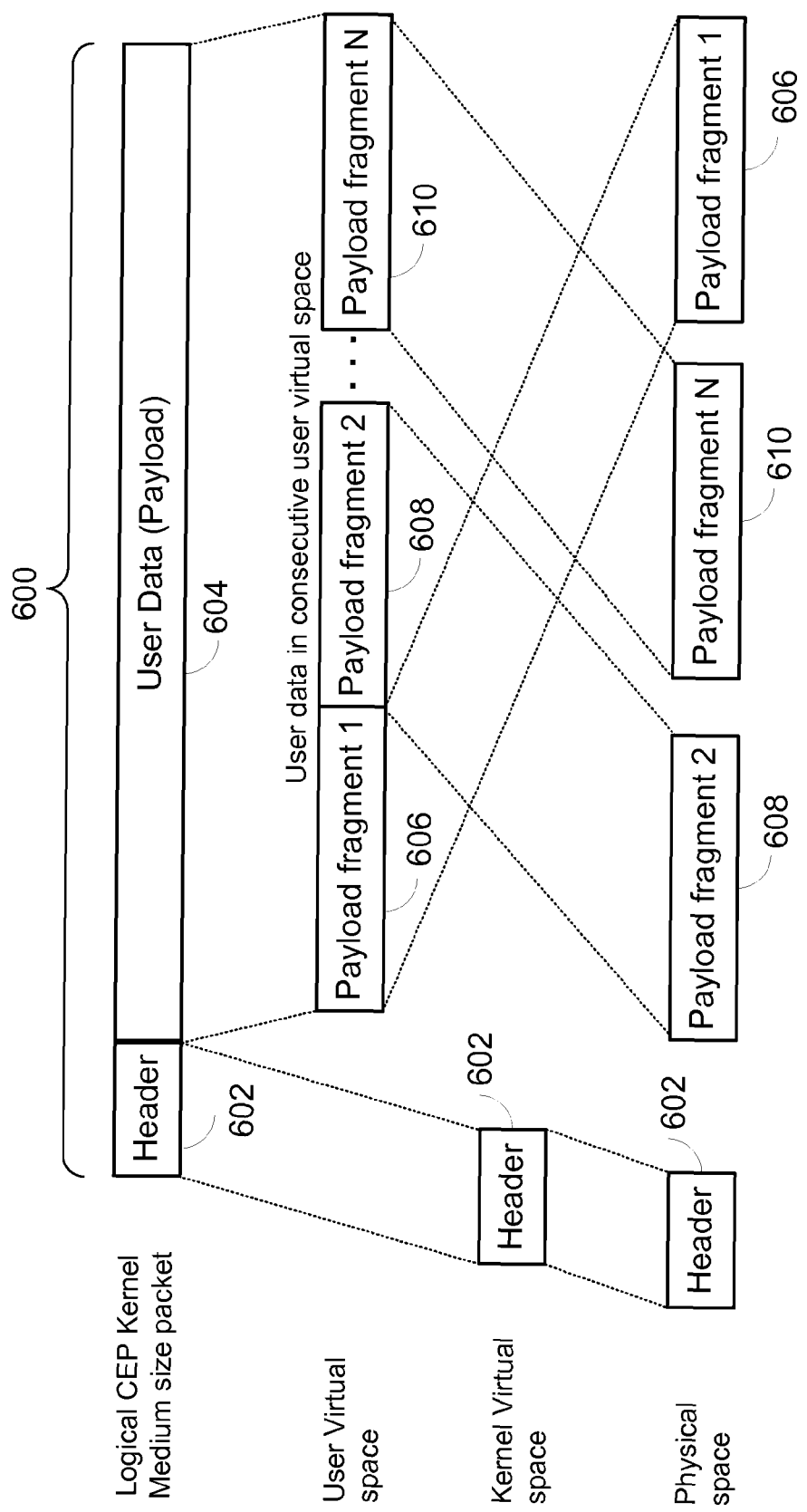
FIG. 8 shows an exemplary medium sized CEP kernel packet 600 in the logical, virtual memory and physical memory domains, according to an embodiment of the present invention.

The sequential virtual memory space may be built from multiple physical memory fragments that may be limited by page size, and that may be aligned to page boundaries at unpredictable physical locations. FIG. 8 depicts the relationship of a medium sized packet (for example PDU type 2, reference numeral 504.2 in FIG. 7) in logical, virtual memory and physical memory domains. This figure shows how a packet may be distributed across physical memory in current processor architectures. Embodiments of the present invention provide an efficient interface between the virtual space that high level software deals with and the simpler but higher performance throughput driven communications hardware.

Shown in FIG. 8, is a Logical CEP Kernel medium sized packet 600 comprising a header 602 and user data 604. The user data 604 includes consecutive payload fragments 606 to 610 (payload fragment 1 to payload fragment N) in the User Virtual space. The header 602 is also shown in the Kernel Virtual space. The header 602 and the payload fragments 606 to 610 are further shown in the Physical space, where the payload fragments 606 to 610 may not be stored consecutively. The optional piggy-backed control messages are not shown in FIG. 8.

Figure 9:
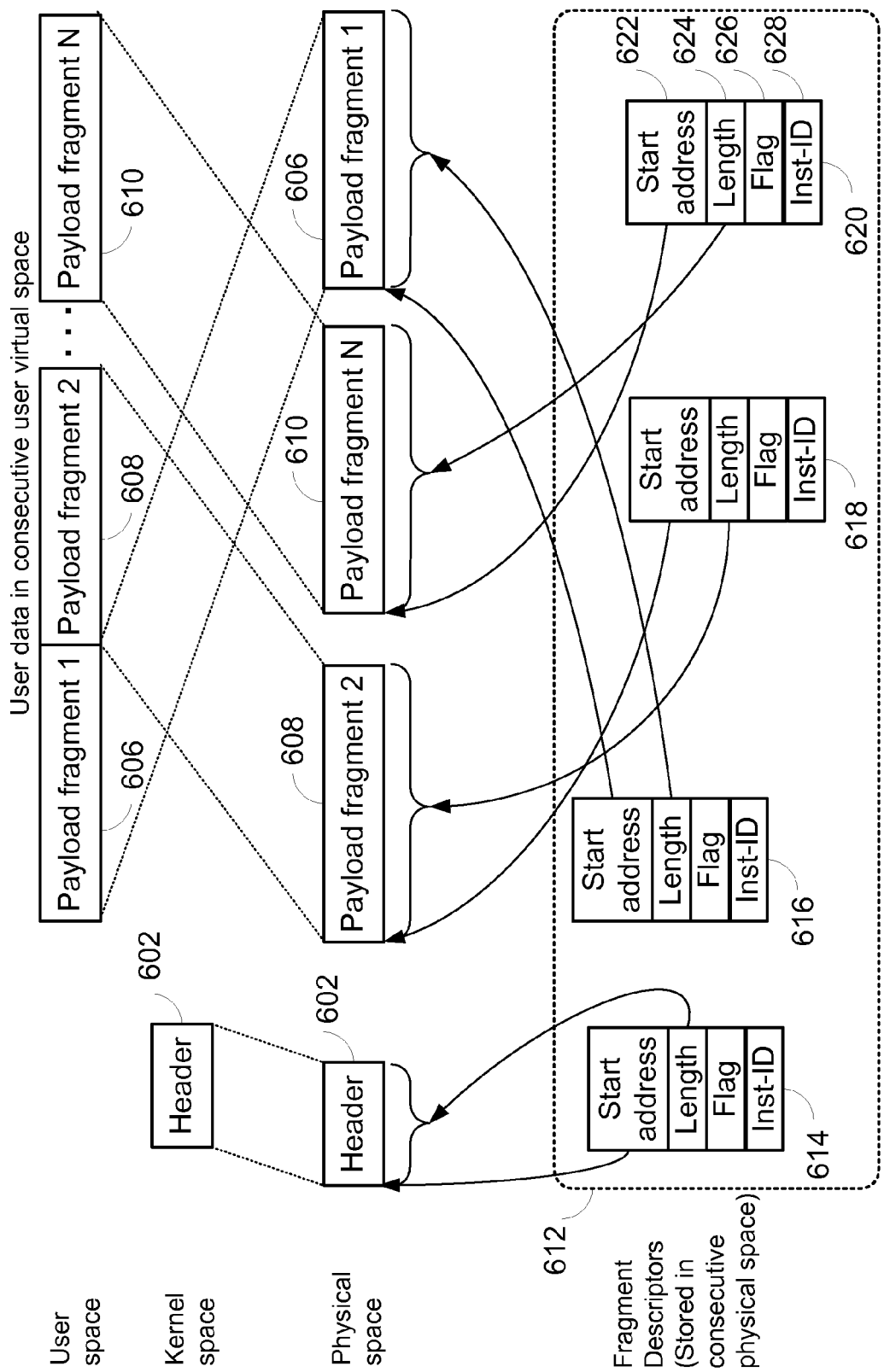
FIG. 9 shows medium sized a CEP kernel packet segment descriptor 612 including fragment descriptors, according to an embodiment of the present invention.

To achieve very high performance at the CEP engine interface 212b, the medium sized packet 600 may be represented by a data structure that defines the physical address of all of the memory locations that include the physical packet. This data structure is called a segment descriptor. The segment descriptor data structure may, in turn, include a multiple set of ordered data that are referred to herein as fragment descriptors. Each fragment descriptor may define a specific instance of a distributed physical memory fragment that may include part of the segment. These are shown in FIG. 9 and may collectively define the entire packet including user payload, CEP kernel header, and in some instances CEP kernel control messages that may be piggy-backed onto the user packet. Since the header and user payload may be bounded, the data required to define a full segment descriptor for the largest medium sized packet segment, may also be bounded as a function of page size and segment size.

Similar to FIG. 8 above, FIG. 9 shows the payload fragments 1 to N (606, 608, and 610) in "User space", i.e. the user data in consecutive user virtual space; the header 602 in "Kernel space"; and both the header 602 and the Payload fragments 1 to N (608, 610, and 606) in "Physical space". Note that the order of the Payload fragments in "Physical space" may not be the same order as in "User space". FIG. 9 further shows a segment descriptor 612, including Fragment descriptors 614, 616, 618, and 620. The fragment descriptors 614-620 of the segment descriptor 612 are stored in order in consecutive physical space. The segment descriptor 612 represents an ordered set of the fragment descriptors 614-620.

Each fragment descriptor 614-620 relates to a fragment in physical space, that is in the example the header 602 and the payload fragments 606, 608, and 610. Each fragment descriptor includes the following fields (field reference numbers apply to each fragment descriptor but are shown for clarity only on the fragment descriptor 620):

An M-bit physical "start address" field 622, which defines the physical address of the first word of the corresponding fragment in physical memory (physical space), i.e. the physical address of the corresponding memory page;

An N-bit "length" field 624 specifying the number of bytes in the corresponding fragment. The maximum value of N may be equivalent to the number of bytes in the page size used in the target system;

A P-bit "flag" field 626, which may be used for control purposes. For a fragment descriptor that is part of a segment descriptor (fragment descriptor set) 612 describing a single segment or medium sized packet (as in the example of FIG. 9), only one bit in the "flag" field is used. This bit is set to 1 to indicate to the CEP engine that this is the last fragment descriptor of the segment descriptor (ordered set) 612. If the current fragment descriptor is not the last fragment descriptor, this bit is set to the value 0. The other bits of the "flag" field 626 need not be used and may be set to 0, although the use of one of these other bits in processing large packets is described hereunder.

An I-bit "instance identifier (ID)" field 628. The "instance ID" represents the sequence of the packet or segment and is the same in all fragment descriptors for the entire packet segment descriptor 612.

The CEP engine 150 may be configured to use the segment descriptor 612 (which includes an ordered set of fragment descriptors) to engage an intelligent DMA engine to pull the entire data packet out of physical memory. Note that the CEP driver 502 may place the entire segment descriptor data structure into consecutive physical memory for easy access by hardware driven DMA. This memory may optionally be dedicated to the CEP engine 150 or may be part of system memory (see Packet Output Queue 830 in FIG. 14 below). The values of "P" and "I" defining the sizes of the "flag" field 626 and the "instance ID" field 628 respectively may be chosen for convenience in implementation. The "flag" field 626 is used for control purposes and the number of bits may increase as the technology matures. The "instance ID" field 628 is used for packet reordering and guaranteed delivery (see the copending application Ser. No. 11/554,535). Its value must be sufficiently large to handle all outstanding segments.

Large Size CEP Kernel Packets

Large CEP kernel packets may be larger than the maximum segment size (as described above, a segment may be defined as the largest packet size that is optimal for transmission through the communications system). As a result and according to an embodiment of the present invention, a large packet is preferably segmented at the transmitting end into multiple segments and is preferably reassembled at the receiving end back into the original large packet for processing by the remote peer CEP kernel 148, for the ultimate consumption of the payload by the workload 112. All segments of the decomposed large packet may include the maximum segment size with the possible exception of the last segment, which may be sized anywhere from one payload byte plus CEP kernel header up to the maximum segment size.

Recall that a segment of a CEP kernel packet may be the result of the CEP protocol stack's SAR (segmentation and reassembly) process for matching the MTU (Maximum Transfer Unit) imposed either by the underlying communications network limitations or by the need for optimized performance. A segment descriptor may include an ordered set of fragment descriptors, each of which may point to the distributed fragments of physical memory that may include the entire packet (as shown in FIG. 9). The segment descriptor may provide all of the information for the CEP engine intelligent DMA to read the header, user payload data, and potentially piggy-backed control messages directly out of main system memory using physical addresses to transmit the entire segment. Recall also that a memory fragment (memory page) is distinctly different from a segment in a CEP kernel packet. Memory fragmentation is due to the inability to keep a packet or a segment of a packet in a consecutive range of physical memory because of paging and the addition of a header.

Figure 10:
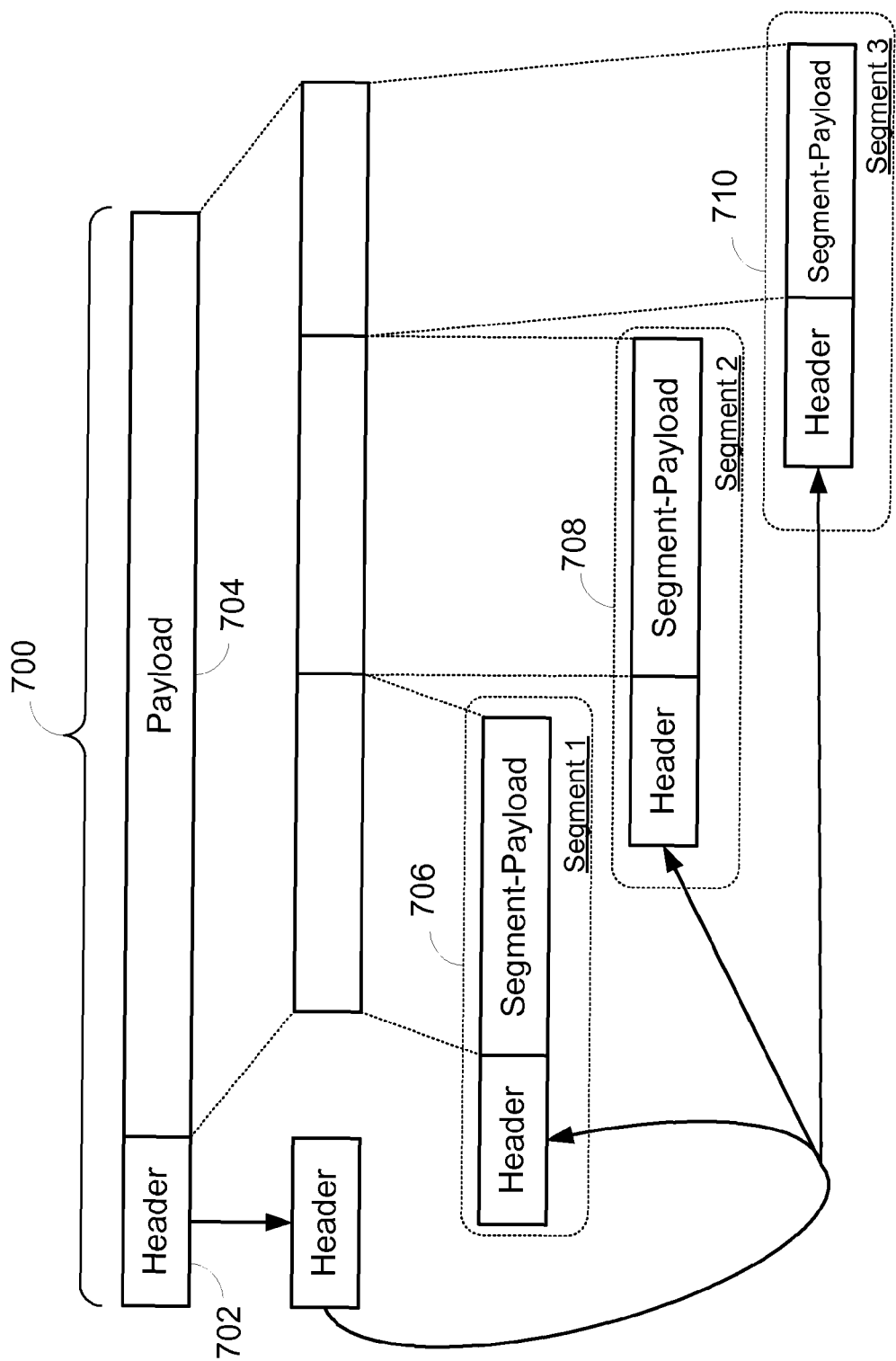
FIG. 10 shows an exemplary large sized CEP kernel packet 700 and shows how it may be segmented into multiple segments, according to an embodiment of the present invention.

From a performance standpoint, it may not be possible or efficient to use virtual addresses to describe the large packet to the CEP engine (as with the medium size packet). Instead, another data structure that defines the physical representation of the large packet may be defined. FIG. 10 depicts a large CEP kernel packet 700 including a (CEP kernel) header 702 and a (large) payload 704, and shows how it may be segmented into multiple segments 706, 708, and 710 that collectively define the entire large packet. The CEP kernel header 702 is placed at the front of each segment of the large packet.

The large CEP kernel packet 700 may be represented to the CEP engine 150 as a series of segment descriptors, each describing one segment of the segmented large CEP kernel packet (i.e. the segments 706 to 710). For large packets that comprise multiple segments, this implementation may have a performance disadvantage of requiring a lot of descriptor data to be transmitted to the CEP engine 150 to initiate the transaction, and may utilize an undue amount of CEP engine memory. To increase flexibility, improve scaling, and in many cases improve performance, an additional mode called segment chaining may be defined for representing large CEP kernel packets 700 to the CEP engine 150 across the interface 212b. Segment chaining enables the entire large packet to be represented to the CEP engine 150 through a single simplified data structure. This data structure may be interpreted by the CEP engine 150 intelligent DMA function (the DMA 814, see FIG. 12 below) to extract the whole packet, segment by segment, for transmission across the communications network. The segment chaining data structure is depicted in FIG. 11.

Figure 11:
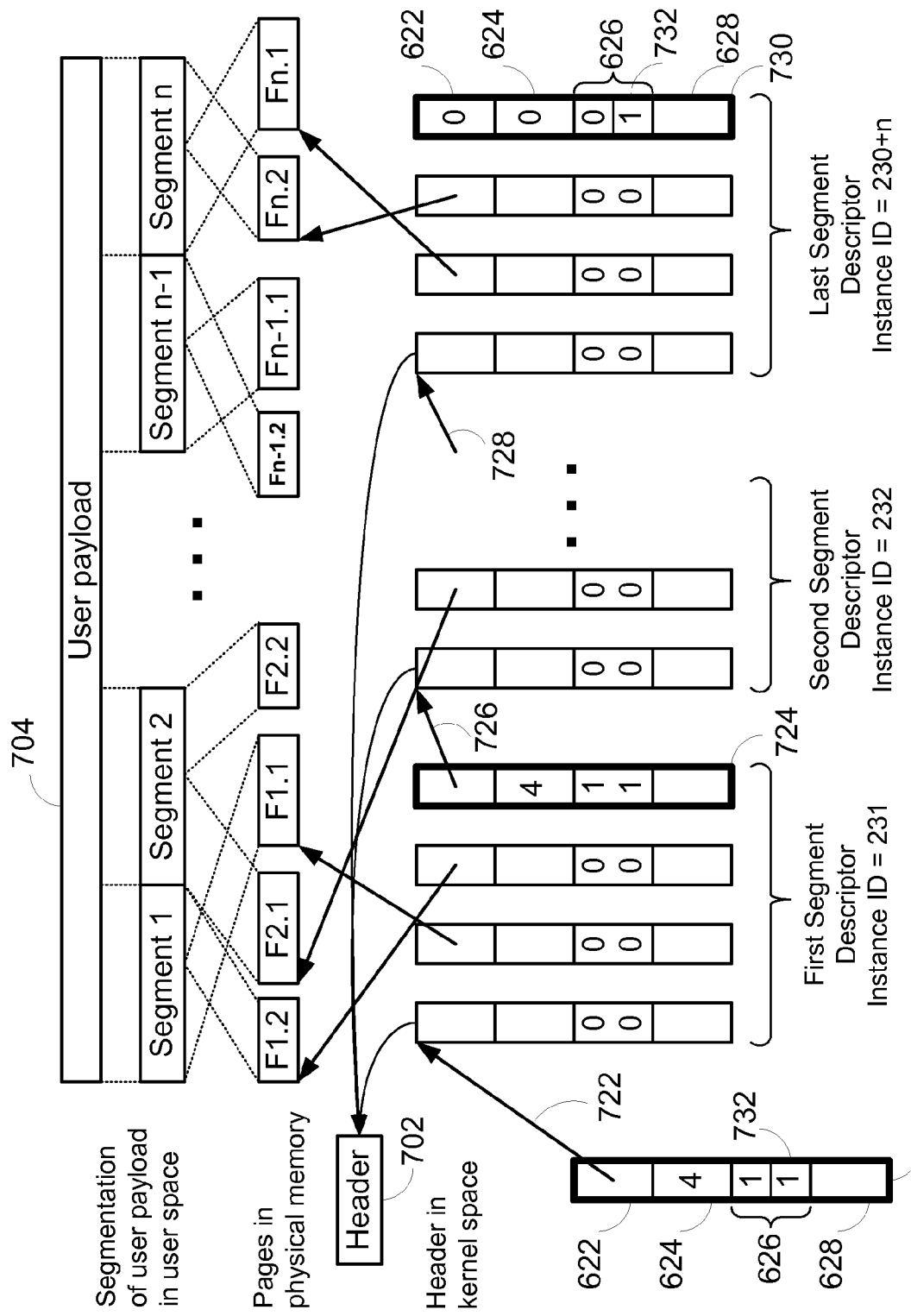
FIG. 11 shows an exemplary large packet segment chaining data structure, according to an embodiment of the present invention.

FIG. 11 shows an exemplary large packet segment chaining data structure, according to an embodiment of the present invention. Illustrated in FIG. 11 are:

the user payload 704 from FIG. 10;

a segmentation of the user payload in user space, into a number of segments (Segment 1, Segment 2, . . . , Segment n−1, and Segment n);

a fragmentation of the segments into pages in physical memory:
the Segment 1 into fragments F1.1 and F1.2,
the Segment 2 into fragments F2.1 and F2.2,
the Segment n−1 into fragments Fn-1.1 and Fn-1.2,
the Segment n into fragments Fn.1 and Fn.2,
the Header 702 (from FIG. 10) in kernel space;
an initial Segment Chain Descriptor 720; and
first, second and last Segment Descriptors, identified by their instance IDs (231, 232, and 230+ n).

While Segments (Segment 1 to Segment n) are shown fragmented into only two fragments each in FIG. 11 for reasons of easier depiction, it is understood that each segment may be fragmented into a larger number of fragments (pages), governed by the memory page size and the predetermined segment size.

Each Segment Descriptor includes a number of fragment descriptors and a Segment Chain Descriptor in consecutive memory space. It is important to note that while segment descriptors are stored in consecutive memory, the multiple individual segment descriptors that collectively define a CEP Kernel PDU do not have to be stored in consecutive memory unless it is advantageous to do so in an implementation. Segment Chain Descriptors are distinguished from fragment descriptors in FIG. 11 through a bolded outline. Each fragment descriptor and each Segment Chain descriptor includes 4 fields (the "start address" field 622, the "length" field 624, the "flag" field 626, and the "instance ID" field 628 as described earlier).

The "start address" field of the initial Segment Chain Descriptor 720 indicates the start address of the first fragment descriptor of the first Segment Descriptor (instance ID=231), illustrated by a pointer (arrow) 722 from the "start address" field of the initial Segment Chain Descriptor 720 to the first fragment descriptor in the First Segment Descriptor. The "start address" field of this first fragment descriptor in turn points to the Header 702. The subsequent fragment descriptors of the first Segment Descriptor (instance ID=231) point to the physical memory fragments F1.1, F1.2 (in their natural order) of the Segment 1, followed by a Segment Chain Descriptor 724. The Segment Chain Descriptor 724, through a pointer arrow 726, points to the start of the Second Segment Descriptor (Instance ID=232). Again, the first fragment descriptor of this Second Segment Descriptor (Instance ID=232) points to the Header 702 and subsequent fragment descriptors point to the memory fragments of the Segment 2 (F2.1, etc). Similarly, additional Segment Descriptors include fragment descriptors pointing to the header and segment fragments (not shown) and are chained through Segment Chain Descriptors to subsequent Segment Descriptors. In the example shown in FIG. 11, there are n segments, and the Last (n-th) Segment Descriptor (Instance ID=230+n) is again shown. The Segment Chain Descriptor of the second-to-last Segment Descriptor (Instance ID=230+n−1) (not shown) provides a pointer 728 to the last Segment Descriptor (Instance ID=230+n) whose fragment descriptors point to the Header 702 and the fragments Fn.1 and Fn.2. The last Segment Descriptor finally includes a last Segment Chain Descriptor 730 whose "start address" field 622 and "length" field 624 each contain a value of zero to indicate the end of the descriptor chain.

As the example illustrated in FIG. 11, shows, a segment descriptor used in chaining mode may have the same format as the segment descriptor 612 for the medium sized packet (i.e., it may include an ordered set of memory fragment descriptors), with the addition of one extra descriptor to the set called a "segment chaining descriptor" (reference numerals 724 and 730 in FIG. 11). The segment chaining descriptor may be identical to the memory fragment descriptor in size and field format but it is used in a new mode, as follows. The "flag" field 626 includes a chaining bit 732 which may be set to 1. This causes the DMA function within the CEP engine to interpret the descriptor as a segment chaining descriptor. The "start address" field 622 may point to the first byte in physical memory of the next chained segment descriptor (e.g. in FIG. 11 the "start address" field 622 of the segment chaining descriptor 724 points to the start of the first descriptor in the Second Segment Descriptor ID=232. The "length" field 624 may include the number of memory fragment descriptors plus the segment chaining descriptor within the next segment descriptor (e.g. in FIG. 11 the value of the "length" field 624 of the segment chaining descriptor 724 is "4", indicating that the Second Segment Descriptor ID=232 contains 4 descriptors). This may enable the DMA engine (814, FIG. 12 below) to pull in the complete ordered set of memory fragment descriptors that describe the entire segment plus the chaining descriptor to the next segment. The "instance ID" field 628 may be incremented for each segment descriptor. Note that all memory fragment descriptors and the segment chaining descriptor within the segment descriptor advantageously have the same instance ID (e.g. in FIG. 11, the "instance ID" field 628 of every descriptor in the First Segment Descriptor is ID=231, and incremented to 232 in the Second Segment Descriptor). Each segment descriptor, which may include memory fragment descriptors and the segment chaining descriptor, may all be housed in sequential physical memory for ease of access. The chain may continue until all segments of the entire large packet have been sent. Boundary conditions to start and stop the chain may be defined. The chain may start by the CEP driver 502 writing an initial segment chain descriptor (the initial Segment Chain Descriptor 720) to the CEP engine across the interface 212*b* to start the chain (this may be started by the intelligent DMA function 814 (see FIG. 12 below) in the CEP engine 150). The initial segment chain descriptor 720 points to the first segment in the chain (i.e. the First Segment Descriptor ID=231 in FIG. 11). The chain stops when the segment chaining descriptor corresponding to the last segment (i.e. the Segment Chaining Descriptor 730 in the Last Segment Descriptor instance ID=230+n, in FIG. 11) asserts an address and segment length of zero (the "start" address field 622 and the "length" field 624 both being set to zero).

Small Size CEP Kernel Packets

The handling of smaller packets may have a major impact on system performance, as the communications overhead cannot be amortized over large data sets. The small packet is, therefore, preferably treated differently than the large and medium sized CEP kernel packets. A CEP kernel packet may be treated as a small packet when the overheads of indirectly referencing physical memory and using intelligent DMA functions to construct the packet from disparate physical memory locations have a significant latency overhead, compared with other aspects of the communications operation.

According to further aspects of embodiments of the present invention, two methods are presented herewith for handling small packets:

Method 1: The small size packet may be copied into a sequential physical memory segment within host processor main memory by the CEP driver function 502. The small size packet may be a complete CEP protocol unit with consolidated user payload and CEP kernel header. A single memory fragment descriptor (equivalent of a non chained segment descriptor with only one memory fragment) may then be written to the CEP engine 150 across the interface 212b. The DMA engine 814 (see FIG. 12 below) may then read the entire small sized CEP packet from a single sequential memory space, thereby eliminating the overhead of having to reference two or more physical memory fragments. The description of FIG. 12, below, provides additional details on the Method 1.

Method 2: Method 1 may place a consolidated packet into sequential physical system memory. If the latency to access system memory is large compared to packet communications latency, method 2 may provide a way to improve performance. According to method 2, a small size CEP kernel packet may be written directly to memory associated with the CEP engine 150. (refer to FIG. 14 "packet Output Queue" 830). The CEP Transmit Processing Functions 816 (see FIG. 14 below) may have ultra high speed access to this memory for direct access to the packet, thus eliminating one level of indirection and eliminating a DMA read of system memory (also referred to as host processor main memory) via the memory controller (interface 218 in FIG. 7). Note that method 2 requires additional CEP hardware based memory (Packet Output Queue 830 in FIG. 14 below). It is possible to use a hybrid of CEP engine memory and system memory. This may provide optimal performance for random messages and optimum price/performance for heavy continuous throughput of small messages. The description of FIG. 14, below, provides additional details on the Method 2.

Control Structures, Exemplary Embodiments of the Invention

This section provides an exemplary embodiment of the invention and describes the control elements. It will be described in two sections relating to methods and systems embodying both transmit and receive functions.

Transmit Methods

Figure 12:
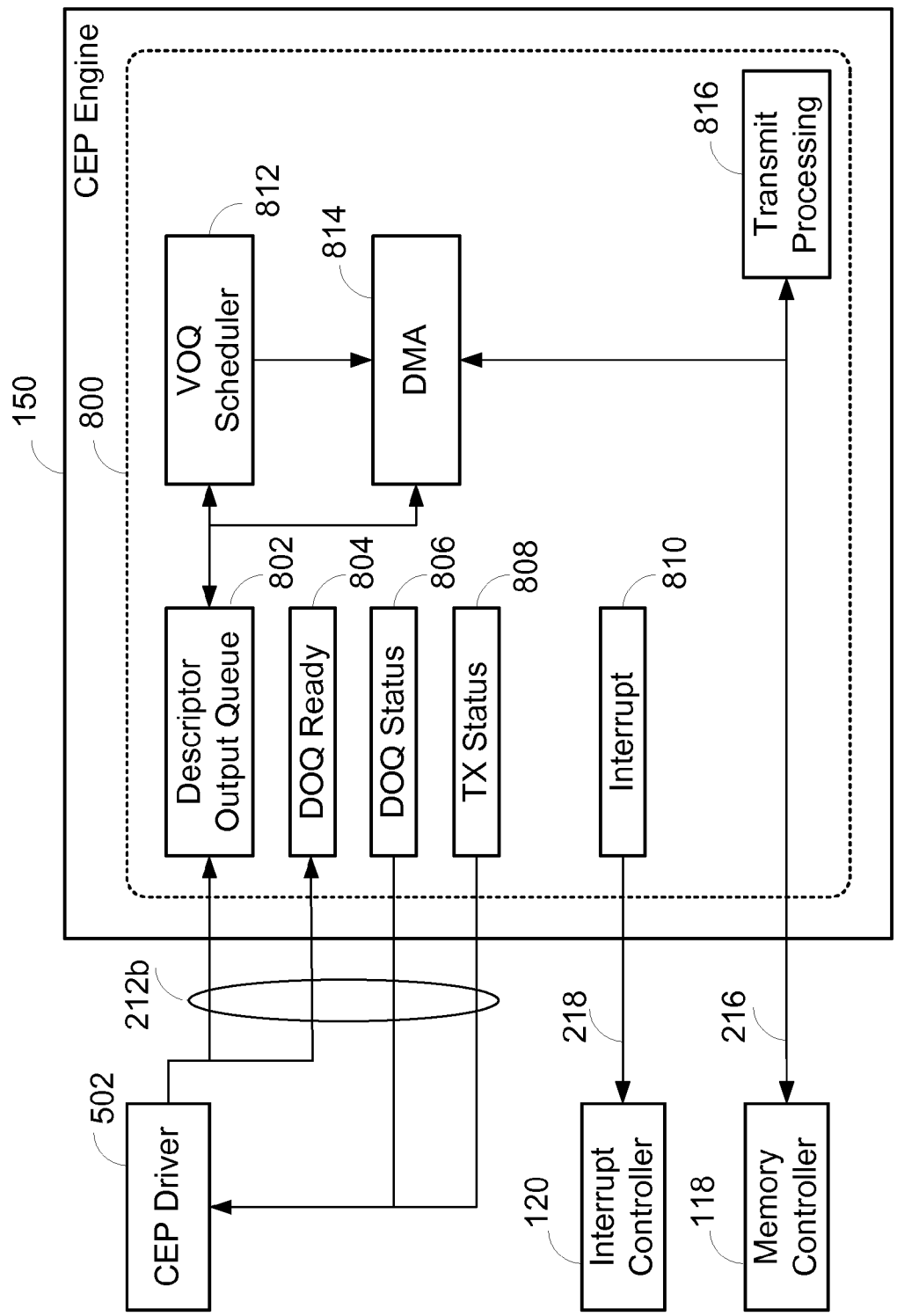
FIG. 12 shows a representation of transmit functions implemented in the CEP engine 150 of FIG. 3 across the hardware-software interface between the CEP driver 502 of FIG. 7 and the CEP engine 150 of FIG. 3, according to an embodiment of the present invention.

FIG. 12 shows a representation of the transmit functions implemented in the CEP engine 150 across the hardware-software interface 212b, according to an embodiment of the present invention. Illustrated in FIG. 12 are the following elements, using the same reference numerals as the same elements shown in FIG. 7 earlier:
- the CEP Driver 502;
- the CEP Engine 150;
- the Interrupt Controller 120; and
- the Memory Controller 118.

The CEP Engine 150 is expanded to show a hardware component 800 including:
- a Descriptor Output Queue (DOQ) 802 which may be implemented as a First-In-First-Out buffer (FIFO);
- a DOQ Ready register 804;
- a DOQ Status register 806;
- a transmit (TX) Status register 808;
- an Interrupt function 810;
- a Virtual Output Queue (VOQ) Scheduler 812;
- a DMA engine 814; and
- a Transmit Processing function 816.

Figure 13:
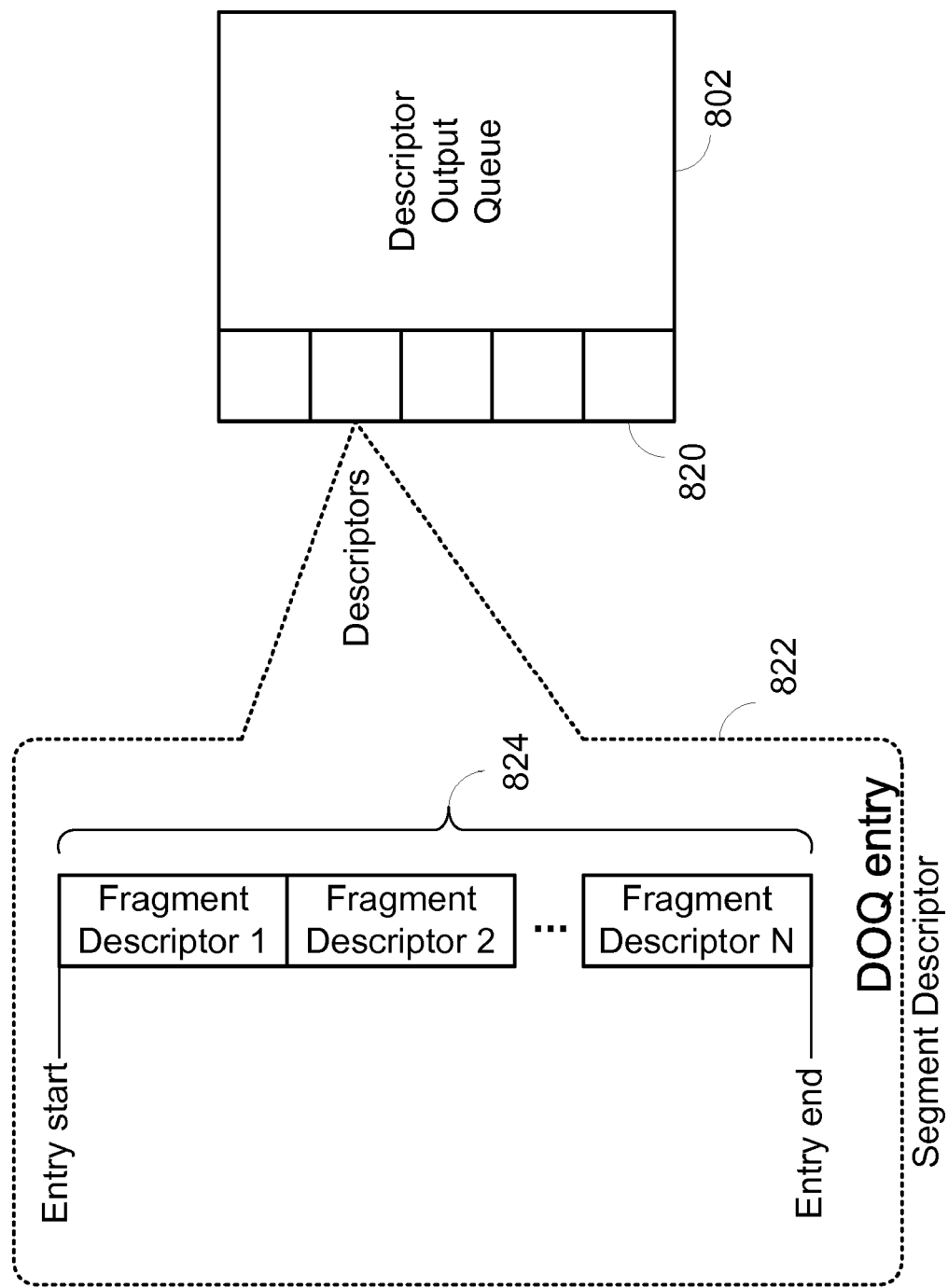
FIG. 13 shows a descriptor output queue entry 822, according to an embodiment of the present invention.

As shown, all control registers (the registers 804, 806, and 808) across the interface 212b may be memory mapped within the system memory space of the host processor, or may be memory mapped within the CEP engine itself (this will depend on performance advantages with respect to target technology, and may indeed change as technology evolves) The memory may also be accessible by internal functionality of the CEP engine 150. All packet descriptors (segment descriptors, fragment descriptors, and segment chain descriptors) describing small (method 1), medium and large packets may be written to the Descriptor Output Queue (DOQ) 802. The CEP driver 502 may write a segment descriptor (including a set of fragment descriptors, see the description of the segment descriptor 612, FIG. 9) to the DOQ 802. The DOQ 802 may be implemented as a FIFO with the entry point of the FIFO being memory-mapped and multi-word, such that a complete segment descriptor may be written. That is, the CEP Driver (502) software sees a range of writable memory in the memory-mapped I/O space (which as described earlier can be in host memory or CEP engine memory). FIG. 13 shows a descriptor output queue entry, according to an embodiment of the present invention, illustrating the structure of the Descriptor Output Queue 802, including DOQ entries 820. Each DOQ entry 820 includes a segment descriptor 822 comprising a number of Fragment Descriptors (Fragment Descriptor 1 to Fragment Descriptor N) in a memory mapped "descriptor queue entry" window 824, having an "entry start" and an "entry end".

For each packet to be transmitted, the driver may write the corresponding segment descriptors 822 to this same address space consecutively. The writable Descriptor Output Queue Ready register 804, (again, memory-mapped) may enable the CEP driver 502 to notify the hardware that it has completed writing the series of descriptors for the current packet/segment. When this register is written, the CEP Engine hardware 800 may first perform the DOQ (FIFO) 802 input operation to accept the content and allow the CEP driver 502 software to write fragment descriptors to the same memory range for the next packet. For systems that are heavily loaded, system performance may be improved by enabling the next write to the first word address of the Descriptor Output Queue 802 to indicate to the CEP Engine hardware 800 that the last fragment descriptor of the last segment has been completely written, and is thus available for transmission. This may trigger the CEP engine 150 to automatically perform the DOQ (FIFO) 802 input operation to accept content. This embodiment allows the CEP driver 502 to continuously write to the DOQ FIFO 802 without having to write to the Descriptor Output Queue Ready register 804 if it has a series of packets/segments to send.

For heavily loaded systems, an improvement on the above method is presented. The CEP engine hardware 800 may take the descriptor data from the DOQ FIFO 802 by a FIFO input operation, and may place it into separate memory locations organized as "virtual output queues" (not explicitly shown in FIG. 12). The virtual output queues may be randomly read by the CEP engine transmission functions (Transmit Processing 816). The order in which segments are transmitted may be a function of the destination and segment priority. This embodiment has the advantage of enabling the VOQ scheduling function 812 to select the next segment to send based on priority, QOS (Quality of Service) guarantees, and destination congestions status, for example. This embodiment permits a far more effective use of communication resources, is sensitive to remote host load, and eliminates head of line blocking. This embodiment also permits higher priority packets to preempt delivery of comparatively lower priority packets even if they are in flight. Thus, overall system performance under load is significantly improved. The capabilities in the VOQ scheduler function 812 to provide a virtual output queue are enablers of the performance advantages outlined above.

The readable memory-mapped Descriptor Output Queue Status register 806 may allow the CEP driver to read the number of empty entries available in the output FIFO (the DOQ 802). The CEP Engine hardware 800 may use this facility to control the rate of data transmission from the host.

When the CEP engine hardware 800 is congested in transmitting data, it may temporarily stop updating this register even though it physically has more free entries in the DOQ FIFO 802 (transmission job requests have been read). This applies a back pressure to the CEP driver 502, which, in turn, may notify the CEP kernel 148 (see FIG. 7). The CEP kernel 148 may then block the sending process, or drop the packet and notify the congestion error according to the API definition, or pass this to the higher layer for it to take the appropriate action.

The TX status register 808 communicates the transmission success status to the CEP kernel 148. The CEP driver 502 preferably should know when the CEP engine hardware 800 has completed the transmission of a packet so that it may inform the CEP kernel 148 of the event. The latter may then unblock the sending process in case of blocking send or acknowledge this fact to the higher layer in a predefined way in case of non-blocking send (see list of MPI functions described earlier). The status of segment transmission may be accomplished by the instance ID. The instance ID may be used sequentially by the CEP driver 502 to uniquely identify each segment. The CEP engine hardware 800 may provide a memory-mapped Instance ID register (not shown) to permit the CEP driver 502 to read the current highest instance ID for which the hardware has completed the use of the associated host memory for all instance IDs equal or lower. Note that this may not be necessarily the latest instance ID for which the hardware has completed reading data from the host memory. This could happen if the CEP engine 150 is using concurrent processing.

If the CEP engine 150 provides hardware based guaranteed delivery, the instance ID may not be updated until the remote end has confirmed receipt of data. The instance ID register may also be used by the CEP engine 150 to flag transmission error events to the CEP driver 502. This may be accomplished by adding a transmission error event flag bit to the instance ID. Normally, the CEP engine 150 would set this flag bit to 0 when it updates the Instance ID register which also contains a Flag field (which includes the transmission error event flag bit). If there is a send failure, the CEP engine 150 would set this bit to 1 on updating the Instance ID register. Once the Instance ID register is updated with the most significant bit of the flag field set to 1, the CEP engine 150 would stop updating this register until the driver has read the updated value; otherwise, the failure event will be lost.

The CEP engine 150 may keep track of the time since the instance ID register was last read. If the register has not been read by the driver within a predefined time since it was first updated after the last read, the CEP engine hardware 800 may generate an interrupt to signal this fact. This may be carried out by the interrupt function 810 in FIG. 12 across the interface 218 to the host interrupt controller 120. Note that the pre-determined time before interrupt is programmable by the CEP driver 502. This scheme is introduced to help with concurrent processing both in the software and in the hardware for improved performance.

The VOQ Scheduler 812 shown in FIG. 12 may determine which segment to send next based on a number of parameters including, destination, priority level, QOS parameters and/or congestion, for example. Once it selects the next segment to be transmitted, the VOQ Scheduler 812 may instruct the DMA engine 814 to read the descriptors (which may be randomly accessed from the DOQ 802) and starts the transmission process.

The DMA engine 814 may provide intelligent DMA operations driven by the segment descriptors, and may read data from system memory via the memory controller 118 (interface 216). For medium size packets, the DMA engine 814 may issue read commands for all memory fragments that make up the packet as defined be the fragment descriptors that may include the total segment descriptor, including header, payload and any control messages. For large packets, the DMA engine 814 may not only issue commands to read the memory fragments but also may command to read the segment descriptors. The DMA engine 814 may be started with the initial segment chain descriptor 720 (FIG. 11) which it uses to fetch the first segment descriptor (which may include an ordered set of memory fragment descriptors plus the next segment chain descriptor). The DMA engine 814 may use the segment descriptor to read the next segment and the segment chain descriptor to concurrently read the next segment descriptor. This cycle of concurrently reading segment data and segment descriptors may continue until the entire packet is complete. The DMA engine 814 may be preempted. When this happens (i.e., the scheduler has selected a higher priority packet) the DMA engine 814 may continue until it reaches a self consistent state and then it continues with the higher priority packet. Once the highest priority packet is being transmitted, the DMA engine 814 runs to completion.

The DMA engine 814 may be preëmptable by any higher priority packet. The DMA engine 814 may save its state information and may resume when the higher priority packet has been serviced. The DMA engine 814 may work on multiple packets concurrently, whether such packets are going to different destinations or whether such packets operate at different priority levels. Packets going to the same destination, in the same QOS flow and at the same priority may be treated sequentially to maintain the order. Data that may include the packet segment (built from multiple physical memory fragments) may be passed to the transmit processing function 816 across the interface 216.

An even higher performance embodiment of the present invention is presented for small packets. In the approach described above (method 1), small packets may be put fully combined and copied into sequential memory for fast access by the DMA engine 814. Yet another embodiment of the present invention (method 2 above) improves performance by placing the packet directly into a CEP engine memory (the Packet Output Queue 830—see FIG. 14). This may provide a significant performance improvement since firstly the processing related to DMA setup, buffer allocation and release, and handshaking between the CEP driver 502 and the CEP Engine hardware 800 often consumes more processing power than allowing the software to write the entire packet to the CEP engine 150 through long word writes; and secondly the Transmit Processing functions 816 have direct high performance access to the packet output queue (i.e. when instructed to transmit the packet by the virtual output scheduler 812). With the introduction of a Packet Output Queue 830 (see FIG. 14 below) for enhanced performance, the Virtual Output Scheduler 812 is extended to be able to select packets from the packet output queue 830 (FIG. 14) as well a segments from the Descriptor Output Queue 802 based on the QOS algorithms.

Figure 14:
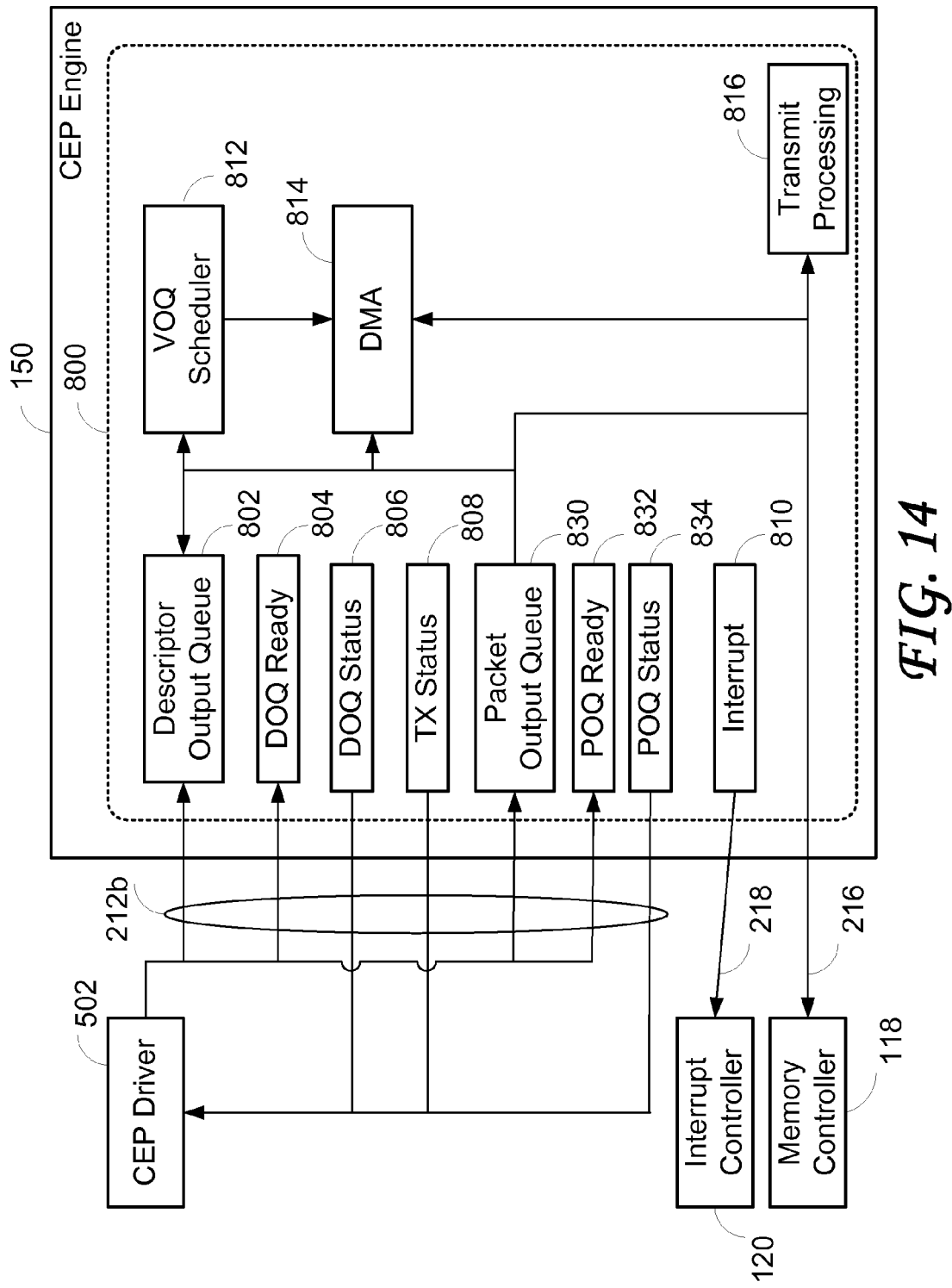
FIG. 14 shows the addition of a packet output queue 830 directly in a hardware 800 of the CEP engine 150 that is accessible across the hardware-software interface between the CEP driver 502 and the CEP engine 150, according to an embodiment of the present invention.

FIG. 14 depicts the addition of a Packet Output Queue 830 directly in the CEP engine hardware 800 that is accessible across the interface 212b. FIG. 14 is similar to FIG. 12, but shows additional elements in the CEP engine hardware 800: The previously mentioned Packet Output Queue 830 which is again memory-mapped, similar to the Descriptor Output Queue 802; a Packet Output Queue (POQ) Ready register 832 for the CEP driver 502 to signal to the CEP Engine hardware 800 the completion of a packet; and a POQ Status register 834. The CEP driver 502 may similarly write continuously to the Packet Output Queue 830 for a series of packets without writing to the POQ Ready register 832 to signal the packet boundaries. Similarly to the status registers associated with the control of the fragment descriptor output queue 802 (i.e., the DOQ Ready register 804 and the DOQ status register 806), the Packet Output Queue (830) may also be provided with the Packet Output Queue Status register 834 and the Packet Output Queue Ready register 832 for the CEP driver 502 to check if the hardware has more room for additional packet output, and to check transmission status. As described above, it is possible to provide a hybrid solution that addresses price/performance that uses both CEP engine memory and system memory for small packets.

Receive Methods

Figure 15:
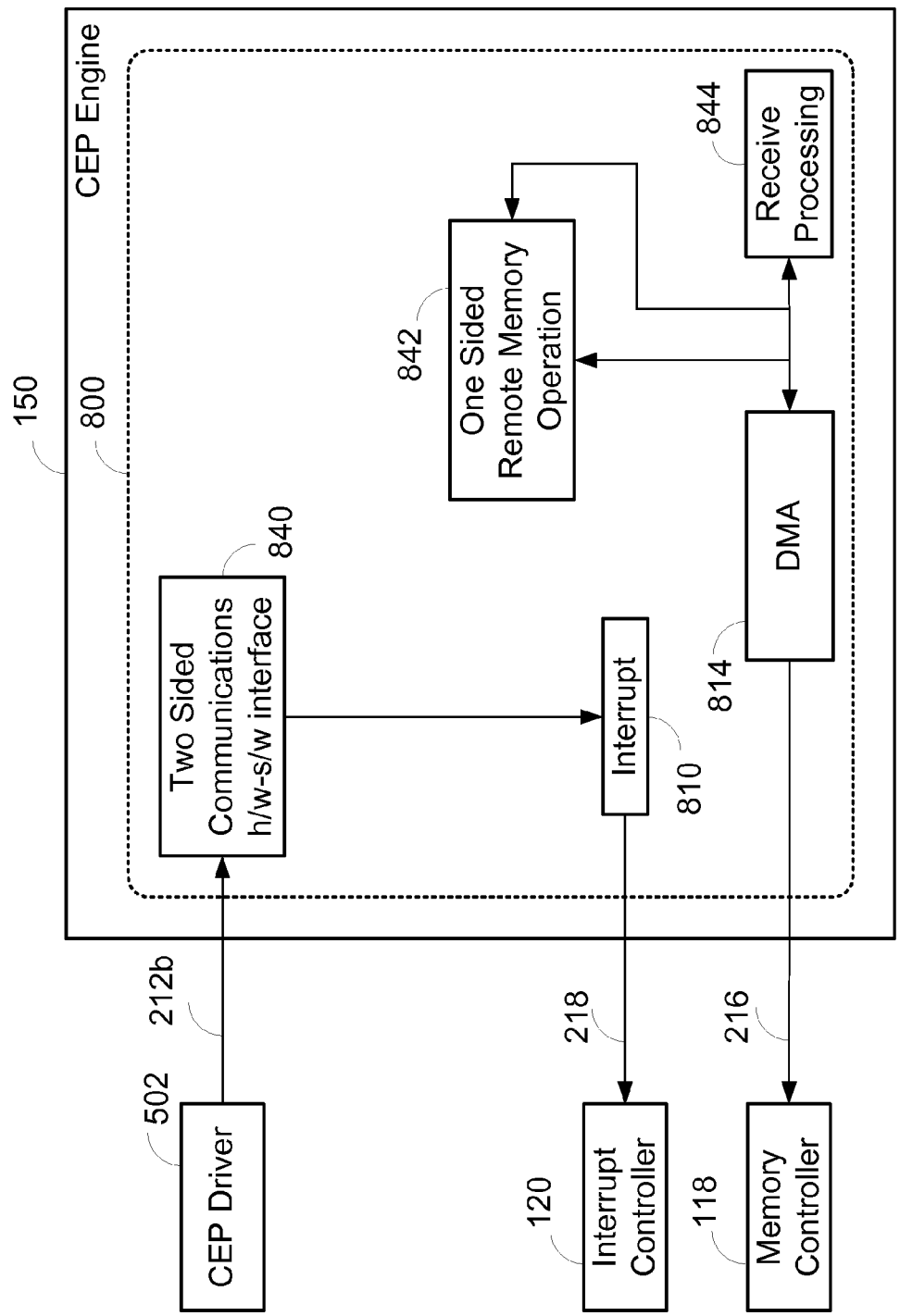
FIG. 15 is a high level overview of receive functions, according to an embodiment of the present invention.

The receive path of the CEP functionality receives packets or packet segments from the communications network which may then be processed. FIG. 15 shows a high level overview of receive functions and the receive interface that is included in the interface 212b. FIG. 15 is similar to FIG. 12, but omitting the transmit related elements and showing receive related elements in the CEP engine hardware 800 instead. In FIG. 15 specifically, the CEP engine hardware 800 includes a "Two Sided Communications hardware-software interface" (or "two-sided communications functional block") 840, a "One Sided Remote Memory Operation" (or "one-sided remote memory functional block") 842, and a "Receive Processing" function 844, in addition to the Interrupt 810 and the DMA engine 814.

A description of the functional blocks according to an embodiment of the present invention follows. The receive processing functional block 844 may be configured to terminate the communications path, and to process the received packet. It should then be determined whether the received packet represents a one-sided or two-sided communication and pass it to the appropriate handler function. The one-sided remote memory functional block 842 may be configured to carry out the memory command by accessing system memory over the interface 216 to access the system memory controller 118. The remote memory access may work on memory for which access has been pre-arranged. Remote memory operations may be one-sided since they don't involve any software either in the CEP kernel 148 (FIG. 3), the operating system 114 or the workload 112 on the remote host and can involve read, write or read-modify write operations. The two-sided communications functional block 840 may be configured to manage the hardware to software interface for maximum performance. The DMA engine 814 may then perform system memory read and write functions over the interface 216 on behalf of the remote memory operations (842) and the two-sided communications functional block (840).

Figure 16:
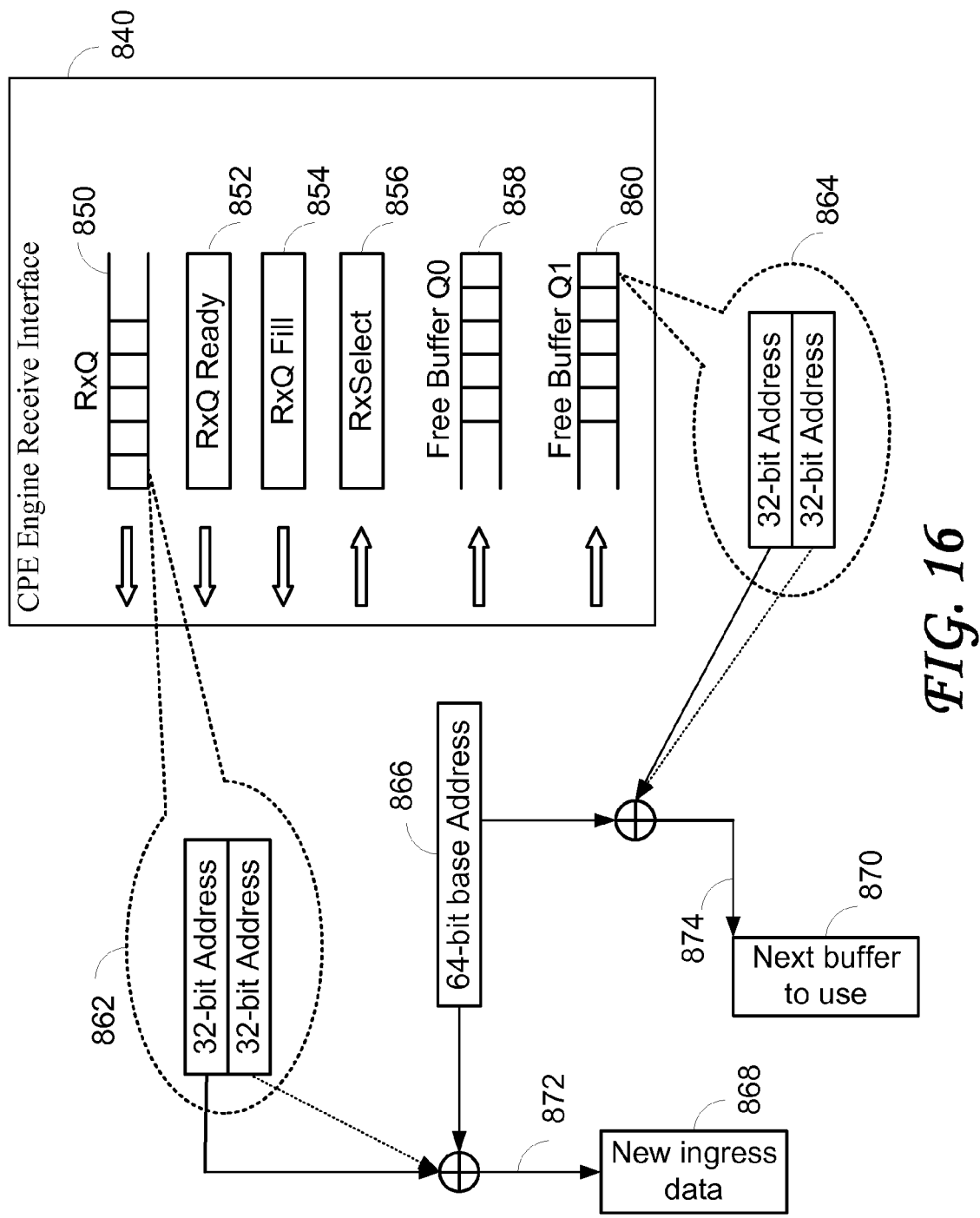
FIG. 16 shows a two-sided communication hardware to software interface, according to an embodiment of the present invention.

The following provides a detailed description of the two-sided communication hardware to software interface 840 as depicted in FIG. 16. FIG. 16 shows the two-sided communication hardware to software interface (labeled "CPE Engine Receive Interface") 840 of FIG. 15, the view expanded to include the following elements:

a readable Reception Queue (RxQ) 850, to yield buffer pointers;

a readable Reception Queue Ready register 852, to yield an RxQ ready interrupt;

a readable Reception Queue Fill register 854, to yield the number of received segments;

a writable Reception Select register 856, to accept a peeping selection;

a writable Free Buffer Queue-0 858, to accept pointers to free buffers; and a writable Free Buffer Queue-1 860, to accept pointers to free buffers.

Hollow arrows shown in the diagram of the CPE engine receive interface 840 indicate read/write directions of the above elements. Further shown in FIG. 16 is a representative RxQ entry 862, a representative Free Buffer Queue entry 864, each comprising two 32-bit address values. FIG. 16 also shows a 64-bit base address register 866, and representative memory locations 868 (New ingress data) and 870 (Next buffer to use) and pointers 872 and 874 to these memory locations (868 and 870 respectively). The pointers 872 and 874 are computed by adding the contents of the 64-bit base address register 866 to a selected 32-bit address value from the RxQ entry 862 and the Free buffer Queue entry 864 respectively, as shown symbolically with Addition symbols.

In the receiving direction, receive buffers may be set up in system memory to house complete segments in contiguous physical memory. The receive buffers may be co-managed by the software (primarily in the CEP driver 520 and the CEP kernel 148) and the hardware (primarily the CEP engine 150). The software may maintain two free lists of buffers, one for loosely controlled traffic and one for strictly controlled traffic (loosely and strictly controlled flows are disclosed in commonly assigned U.S. patent application Ser. No. 11/761,865 entitled "Secure handle for intra- and inter-processor communications", which is incorporated herein by reference. The CEP engine hardware 800 may maintain a memory mapped free buffer FIFO for each flow control type (the Free Buffer Queue-0 858 and the Free buffer Queue-1 860 respectively in FIG. 16). It is through these free buffer FIFOs that the software may allocate free buffers to the hardware 800 and from which hardware 800 may obtain free buffers to use for buffering incoming traffic. This allows the hardware 800 to have expedited access to free buffers without having to interrupt the CEP driver 502, thus ensuring maximum performance. Both buffer types may be managed over the CEP driver to CEP engine interface 212b. Upon receiving a packet or segment, the CEP engine hardware 800 may allocate a buffer to store received data. To maximize performance, the CEP engine may start to write partial packet data or partial segment data immediately to system memory buffers (i.e. in cut-through mode) before the complete packet or segment has been received. Once the whole packet or segment is received, the hardware 800 may calculate the packet error checksum (PEC), which is appended to the packet to validate the integrity of the received packet at the destination. Based on the result of PEC checking, the CEP Engine hardware 800 may either (depending on configuration settings) carry out one or all of the following to synchronize with the CEP software:

A) set a status in the relevant registers (RxQ 850, RxQ Ready 852, and RxQ Fill 854);

B) generate an interrupt; or

C) drop the packet and free the buffer.

The reception of packets or segments may be conveyed by the hardware 800 to the CEP driver 502 through the Reception Queue 850. The Reception Queue 850 may be implemented as a readable FIFO, and the data may represent the start address in system memory (physical host memory) of the buffer where the packet or segment has been stored.

The following is an example of an embodiment that optimizes for performance in a 64-bit architecture, where the total buffer space may be represented (limited to a 4 GByte range addressable) by 32 bits. Each entry in the reception queue (RxQ entry 862, FIG. 16) is a 64-bit register, allowing two 32-bit addresses to be represented; where each 32 bit address represents the offset for the first byte of a received buffer. The exit point of the Reception Queue 850 is similar to the Descriptor Output Queue 802, i.e. it is memory-mapped. This allows the CEP driver 502 to read the indications of packet/segment arrival, up to two at a time. Each of the two address fields points to the start address of the corresponding received packet in the 64-bit address space with the help of a pre-defined 64-bit base address (stored in the 64-bit base address register 866 shown in FIG. 16). If the reception queue 850 is empty, an all-0 value will be returned. If only one entry is valid, the other entry is set to 0 by the CEP Engine 150 hardware. The lower addressed entry represents the packet/segment arrived earlier.

Note that other embodiments may be implemented for machines with different architectures or where buffer space of >4 GByte is required. The above description is one optimization only for high performance across a wide range of applications.

Multiple reception queues 850 may be provided. For example, one reception queue 850 may be provided for each priority. Each reception queue 850 may be memory mapped. This may allow the driver to provide QOS in selecting packet processing priorities and may enable one packet to be processed ahead of an earlier arrived packet at the receiving end, based on priority or other parameter(s). The CEP engine hardware 800 may track whether the Reception Queue 850 is read. If the reception queue 850 has not been read by the CEP driver 502 for a predefined timeout since it was first updated after the last read operation, the CEP engine hardware 800 may generate an interrupt (Interrupt function 810, FIG. 15) to signal this event. Once an interrupt has been generated, no further interrupt may be generated by the hardware for packets/segments arriving subsequently if the original interrupt has not been served by the software. This allows the software (i.e. the CEP driver 502) to serve more received packets by a single interrupt event. The number of interrupt events is preferably optimized so as to improve system performance. The pre-defined timeout before interrupt following last read may be advantageously programmable across the hardware software (i.e., CEP engine 150 to CEP driver 502) interface 212b. The Reception Queue Fill register 854 is a memory mapped readable register that may provide the driver software (i.e. the CEP driver 502) with the number of received packets or segments that have not been conveyed to the CEP driver 502. Out-of-order packet peeping by the driver may be advantageously supported through the Reception Queue Fill register 854 and the Reception Select register 856 (a memory-mapped writable register). The former indicates the current number of received packets not yet conveyed to the CEP driver 502 and the latter allows the CEP driver 502 to signal to the CEP Engine 150 hardware which entry the CEP driver 502 wants to read with the next read operation of the Reception Queue 850. By default, the Reception Select register 856 may have the value of 0 and as a result, a read of the Reception Queue 850 may return the content of the entry at the head of the queue (FIFO exit point). If the Reception Select register 856 is set to some other value n (2, 4, 6 . . . due to pairing in this example) by the driver, the next read of the Reception Queue 850 returns the content of the nth entry from the head of the queue. Each read of the Reception Queue 850 may automatically reset the Reception Select register 856 to 0. When a read is performed not on the head entry of the queue, the queue itself may not updated (the entry read may not be removed from the queue).

The peeping feature may enable the CEP Kernel 148 via the CEP driver 502 to get fast access to data indicating which source is filling up the buffer. This may provide invaluable data for troubleshooting connections, identifying out of balance performance issues, identifying sources not adhering to QOS limits, and for providing the higher level CEP kernel functions with data through which it may throttle source traffic to better balance system throughput.

A CEP based performance function may be added to the CEP engine 150 to provide instrumentation to improve the software interface. This function may analyze the historical and current state of the reception queue 850 and may provide performance data that may be read by the driver (i.e. the CEP driver 502). This includes a current list of entries from given destination (n entries), and a historical list of entries from specific destinations within a sliding time window (programmable).

The CEP driver software 502 may continuously replenish hardware (the CEP engine hardware 800) with free buffers for future packet reception as more incoming traffic arrives and Rx buffers maintained in the Reception Queue 850 are consumed. This functionality may be supported through the two Free Buffer Queues 858 and 860, which are writable FIFOs with paired 32-bit entries. The Free Buffer Queue-0 (858) may be used for loosely controlled flows and the Free Buffer Queue-1 (860) may be used for strictly controlled flows. The driver may simply write the address of the buffer to be freed to the corresponding Free Buffer Queue (858 or 860) when it decides to send a free buffer to hardware (i.e. the RxQ 850). Each entry of the Free Buffer Queue FIFOs may be a pair of 32-bit addresses, allowing two free buffers to be given back to the CEP Engine 150 hardware in one transaction. The hardware (i.e. the RxQ 850) may obtain the next free buffer for incoming traffic from the head of the corresponding FIFO (i.e. the Free Buffer Queues 858 or 860) upon arrival of a new packet/segment. The software (i.e. the CEP driver 502) may give free buffers to the CEP Engine 150 hardware (i.e., the RxQ 850) in batches for increased performance. Internally, the CEP driver software 502 may maintain two lists of free buffers, one for each flow control type. As before, this embodiment is optimized for performance within a 64 bit architecture and where 4 GByte buffer space as represented by 32 bit words is sufficient for the application.

SUMMARY

Advantageously, the entire design has been performance optimized without compromise and has taken full advantage of modern high performance access to memory offered by the latest 64 bit processors. As those of skill may appreciate, however, the structures and functionalities disclosed herein may readily be adapted to higher bit order processors. The two-sided protocol disclosed herein does not have fixed endpoint pairs. At the hardware level, the instance ID (see "instance ID" field 628 in FIGS. 9 and 11) may be local to the transmit end to coordinate synchronization between the CEP engine 150 and the CEP kernel 148. This implementation is lightweight, as compared to using (conventional) packet sequence IDs. The CEP engine 150 may be configured to transmit queues on a per-destination and priority basis, and multiple processes may share these queues. Receive side buffer allocation may be completely independent from the source, thereby eliminating co-ordination latencies. The protocol (the CEP kernel protocols 400 and 500, FIGS. 6 and 7) may advantageously support strictly controlled and loosely controlled buffers. The CEP kernel protocol 500 offers support for guaranteed delivery. The CEP kernel protocol 500 offers a built in mechanism for handling large data that may exceed the MTU of the network. The CEP kernel protocol 500 may have a built in scheduler that may provide QOS and smart transmit choices based on congestion. The DMA engine 814 (FIGS. 12, 14, and 15) may support multiple transmit modes and is preëmptable for higher priority traffic. DMA large packet mode may provide a high level instruction that causes the DMA engine 814 to both concurrently read the chained descriptors and the data. The CEP kernel protocol 500 supports a direct transmit approach for small packets. Context dependent interrupts may be programmed to ensure optimized performance between software and hardware. Packet peeping functionality may be provided to enable performance and troubleshooting to be carried out on received data before they have been passed to the Upper Level Protocol. Embodiments of the present invention support optimized performance based on multiple packet sizes (although three are disclosed herein, the present inventions are not limited thereby).

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A method for transmitting a data packet to a communications medium, the data packet including a header and a payload, the method comprising the steps of:
   segmenting the data packet into one or more segments, each of the segments including a plurality of fragments stored in non-contiguous portions of a computer memory;
   generating a segment descriptor for each segment, each segment descriptor including a fragment descriptor for each of the plurality of fragments in a respective segment such that one of the generated fragment descriptors is exclusively associated with the header and at least one other of the generated fragment descriptors is associated with at least a portion of the payload;
   storing the generated fragment descriptors for each segment descriptor in contiguous portions of the computer memory;
   sending the plurality of fragment descriptors for each segment descriptor across an interface;
   retrieving the fragment descriptors from the interface;
   reassembling each segment of the data packet by retrieving the header and the payload associated with the retrieved fragment descriptors for a respective segment descriptor from the computer memory, and
   transmitting the reassembled data packet segments to the communications medium.

2. The method of claim 1, wherein the segmenting, generating, storing and sending steps are carried out by a communications endpoint processor (CEP) kernel.

3. The method of claim 1, wherein the segmenting, storing and sending steps are carried out in protected kernel space.

4. The method of claim 1, wherein the segmenting, storing and sending steps are carried out in user space.

5. The method of claim 2, wherein at least some of the functionality of the CEP kernel is carried out by software.

6. The method of claim 1, wherein the retrieving, reassembling and transmitting steps are carried out by a CEP engine.

7. The method of claim 6, wherein at least some of the functionality of the CEP engine is carried out by hardware.

8. The method of claim 1, wherein the segmenting step is carried out such that each fragment descriptor includes a data structure that defines a physical address in the computer memory of its corresponding fragment.

9. The method of claim 1, wherein the segmenting step is carried out such that each fragment descriptor includes a pointer to a physical address in the computer memory of its corresponding fragment, a length field indicating a length in bytes of its corresponding fragment, a flag field indicating whether its corresponding fragment is a last fragment of the payload, and an instance ID field.

10. The method of claim 9, wherein the segmenting step is carried out such that each fragment descriptor of each fragment into which the data packet is segmented stores a same instance ID in the instance ID field.

11. The method of claim 1, further comprising generating a segment descriptor that is associated with all of the fragment descriptors of the fragments into which the data packet is segmented.

12. The method of claim 1, wherein the data packet has a size greater than a predetermined maximum size and is segmented into a plurality of segments, and wherein at least one segment descriptor is stored in a portion of contiguous memory that is not contiguous to any portion of memory in which any other segment descriptor for the data packet is stored.

13. The method of claim 1, wherein the segmenting step segments the data packet into at least two segments whose size is equal to or less than a predetermined maximum size.

14. The method of claim 13, wherein each of the at least two segments is associated with a respective segment descriptor and wherein each of the at least two segments includes a same header and a plurality of fragments, the header and the plurality of fragments each being associated with a respective fragment descriptor.

15. The method of claim 14, wherein the segmenting step includes a chaining step to chain the respective segment descriptors associated with the at least two segments.

16. The method of claim 15, wherein chaining step includes generating a first segment chain descriptor that includes a start address field configured to store a start address of a first fragment descriptor of a first fragment of a first one of the at least two segments and at least one second segment chain descriptor between other ones of the at least two segments.

17. The method of claim 14, wherein each respective segment descriptor includes an instance ID field and wherein the segmenting step includes storing unique and sequentially numbered instance IDs in the respective instance ID fields.

18. A computer communications interface for transmitting a data packet to a communications medium, the data packet including a header and a payload, comprising:
   a communications endpoint processor (CEP) interface;
   a CEP kernel coupled to the CEP interface, the CEP kernel being configured to segment the data packet into one or more segments, each of the segments including a plurality of fragments stored in non-contiguous portions of a computer memory, to generate a segment descriptor for each segment, each segment descriptor including a fragment descriptor for each of the plurality of fragments in a respective segment such that one of the generated fragment descriptors is exclusively associated with the header and at least one other of the generated fragment descriptors is associated with at least a portion of the payload, to store the fragment descriptors for each segment descriptor in contiguous portions of the computer memory and to send the plurality of fragment descriptors for each segment descriptor across the CEP interface, and
   a CEP engine coupled to the CEP interface, the CEP engine being configured to retrieve the fragment descriptors from the interface, to reassemble each segment of the data packet by retrieving the header and the payload associated with the fragment descriptors for a respective segment descriptor from the computer memory, and to transmit the reassembled data packet segments to the communications medium.

19. The computer communications interface of claim 18, wherein at least some of the functionality of the CEP kernel is implemented in software.

20. The computer communications interface of claim 18, wherein at least some of the functionality of the CEP engine is implemented in hardware.

21. The computer communications interface of claim 18, wherein each fragment descriptor includes a data structure that defines a physical address in the computer memory of its corresponding fragment.

22. The computer communications interface of claim 18, wherein each fragment descriptor includes a pointer to a physical address in the computer memory of its corresponding fragment, a length field indicating a length in bytes of its corresponding fragment, a flag field indicating whether its corresponding fragment is a last fragment of the payload and an instance ID field.

23. The computer communications interface of claim 22, wherein each fragment descriptor of each fragment into which the data packet is segmented stores a same instance ID in the instance ID field.

24. The computer communications interface of claim 18, wherein the CEP kernel is further configured to generate a segment descriptor that is associated with all of the fragment descriptors of the fragments into which the data packet is segmented.

25. The computer communications interface of claim 18, wherein the data packet exceeds a predetermined maximum size and is segmented into a plurality of segments, and wherein at least one segment descriptor is stored in a portion of contiguous memory that is not contiguous to any portion of memory in which any other segment descriptor for the data packet is stored.

26. The computer communications interface of claim 18, wherein the CEP kernel is further configured to segment a data packet whose size exceeds a predetermined maximum size such that the data packet is segmented into at least two segments whose size is equal to or less than the predetermined maximum size.

27. The computer communications interface of claim 26, wherein each of the at least two segments is associated with a respective segment descriptor and wherein each of the at least two segments includes a same header and a plurality of fragments, the header and the plurality of fragments each being associated with a respective fragment descriptor.

28. The computer communications interface of claim 27, wherein the CEP kernel is further configured to chain the respective segment descriptors associated with the at least two segments.

29. The computer communications interface of claim 28, wherein the CEP kernel is further configured to generate a first segment chain descriptor that includes a start address field configured to store a start address of a first fragment descriptor of a first fragment of a first one of the at least two segments and at least one second segment chain descriptor between other ones of the at least two segments.

30. The computer communications interface of claim 27, wherein each respective segment descriptor includes an instance ID field and wherein the segmenting step includes storing unique and sequentially numbered instance IDs in the respective instance ID fields.

31. The computer communications interface of claim 18, wherein the CEP kernel runs in protected kernel space.

32. The computer communications interface of claim 18, wherein the CEP kernel runs in user space.

* * * * *